(12) United States Patent
Kim

(10) Patent No.: US 12,001,009 B2
(45) Date of Patent: Jun. 4, 2024

(54) CAMERA MODULE COMPRISING A LIQUID LENS AND PERFORMING OPTICAL IMAGE STABILIZATION

(71) Applicant: LG INNOTEK CO., LTD., Seoul (KR)

(72) Inventor: Hoon Kim, Seoul (KR)

(73) Assignee: LG Innotek Co., Ltd., Seoul (KR)

( * ) Notice: Subject to any disclaimer, the term of this patent is extended or adjusted under 35 U.S.C. 154(b) by 84 days.

(21) Appl. No.: 17/753,962

(22) PCT Filed: Sep. 17, 2020

(86) PCT No.: PCT/KR2020/012557
§ 371 (c)(1),
(2) Date: Mar. 18, 2022

(87) PCT Pub. No.: WO2021/054739
PCT Pub. Date: Mar. 25, 2021

(65) Prior Publication Data
US 2022/0334374 A1 Oct. 20, 2022

(30) Foreign Application Priority Data
Sep. 18, 2019 (KR) .......................... 10-2019-0114990

(51) Int. Cl.
*G02B 26/00* (2006.01)
*G02B 3/14* (2006.01)
(Continued)

(52) U.S. Cl.
CPC ............. *G02B 26/004* (2013.01); *G02B 3/14* (2013.01); *G02B 27/646* (2013.01);
(Continued)

(58) Field of Classification Search
CPC .............. G02B 13/0075; G02B 26/004; G02B 27/646; G02B 3/14; G02B 7/021;
(Continued)

(56) References Cited

U.S. PATENT DOCUMENTS

| 9,313,376 B1* | 4/2016 | Bertolami .......... H04N 1/00161 |
| 2019/0129076 A1* | 5/2019 | Choi ...................... G02B 7/021 |
| 2020/0192080 A1* | 6/2020 | Karam ............... G02B 13/0075 |

FOREIGN PATENT DOCUMENTS

| JP | 2011-251277 A | 7/2011 |
| KR | 10-2017-0067581 A | 6/2017 |

(Continued)

OTHER PUBLICATIONS

International Search Report dated Dec. 15, 2020 in International Application No. PCT/KR2020/012557.

*Primary Examiner* — Antoinette T Spinks
(74) *Attorney, Agent, or Firm* — SALIWANCHIK, LLOYD & EISENSCHENK

(57) ABSTRACT

Disclosed is a camera module comprising: a lens assembly including a liquid lens; an image sensor for receiving light that has passed through the lens assembly; a detecting sensor for detecting the movement of the lens assembly to generate a motion signal; a voltage controller for generating a driving signal to control an interface of the liquid lens in response to the motion signal; a detecting unit for outputting a motion frequency from the motion signal; and a driving unit for changing an image-capture timing of the image sensor according to the motion frequency.

9 Claims, 15 Drawing Sheets

(51) Int. Cl.
  *G02B 27/64* (2006.01)
  *H04N 23/68* (2023.01)
  *H04N 23/54* (2023.01)
  *H04N 23/55* (2023.01)
(52) U.S. Cl.
  CPC ....... *H04N 23/6812* (2023.01); *H04N 23/682* (2023.01); *H04N 23/54* (2023.01); *H04N 23/55* (2023.01)
(58) Field of Classification Search
  CPC ........ G03B 17/55; H04N 23/54; H04N 23/55; H04N 23/57; H04N 23/6812; H04N 23/682; H04N 23/685; H04N 25/74
  See application file for complete search history.

(56) References Cited

FOREIGN PATENT DOCUMENTS

| KR | 20170067581 A | * | 6/2017 |
| KR | 10-2018-0114804 A | | 10/2018 |
| KR | 10-1908658 B1 | | 12/2018 |
| KR | 10-2019-0089574 A | | 7/2019 |
| WO | 2019/046718 A2 | | 3/2019 |

* cited by examiner $V2 > V1$ $V3 > V2$

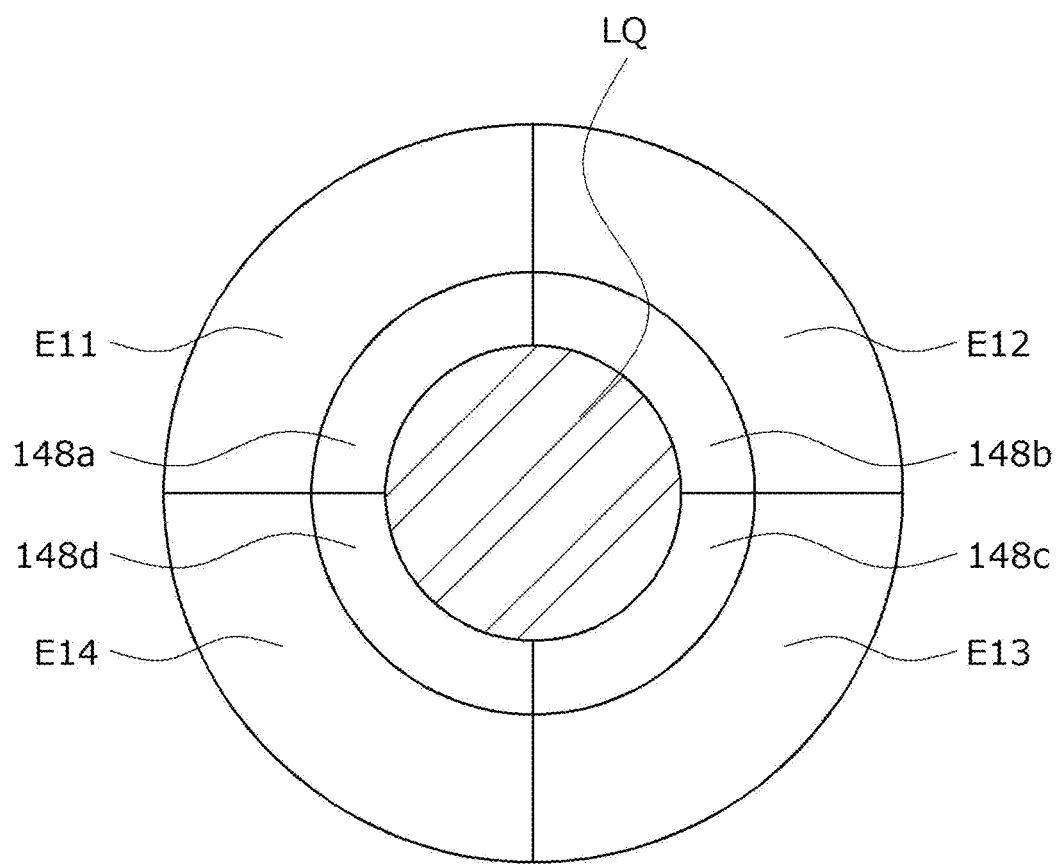

CAMERA MODULE COMPRISING A LIQUID LENS AND PERFORMING OPTICAL IMAGE STABILIZATION

CROSS-REFERENCE TO RELATED APPLICATIONS

This application is the U.S. national stage application of International Patent Application No. PCT/KR2020/012557, filed Sep. 17, 2020, which claims the benefit under 35 U.S.C. § 119 of Korean Application No. 10-2019-0114990, filed Sep. 18, 2019, the disclosures of each of which are incorporated herein by reference in their entirety.

TECHNICAL FIELD

The present invention relates to a camera module.

BACKGROUND ART

Users of portable devices want optical devices having a high resolution, a small size, and various photographing functions. For example, various photographing functions may be at least one of an optical zoom function (zoom-in/zoom-out), an auto-focusing (AF) function, and an optical image stabilization (OIS) function.

In the related art, a method in which a plurality of lenses are combined and the combined lenses are directly moved is used in order to implement the above-described various photographing functions. However, when the number of lenses increases in this way, the size of the optical device may increase.

The AF function and the OIS function are performed by moving or tilting a plurality of lenses fixed to a lens holder and arranged in an optical axis in an optical axis direction or a direction perpendicular to the optical axis direction. To this end, a separate lens driving device for driving a lens assembly including the plurality of lenses is required. However, the lens driving device consumes high power, a cover glass should be added separately from the camera module to protect the lens driving device, and thus the overall size of the camera module according to the related art increases. In order to solve this problem, researches on a liquid lens unit that performs the AF function and the OIS function by electrically adjusting a curvature of an interface between two liquids are being conducted.

However, in the liquid lens unit, an error occurs due to a change in wavefront.

DISCLOSURE

Technical Problem

The present invention is directed to providing a camera module that performs imaging in a section having a small error even when an error occurs due to a change in wavefront by optical image stabilization (OIS).

The present invention is directed to providing a camera module that minimizes a wavefront error (WFE) due to a frequency/period of tilting by a camera module or the OIS.

The problem to be solved in embodiments is not limited thereto and also includes the purpose or effect that may be identified from the technical solution or the embodiments of the problem to be described below.

Technical Solution

One aspect of the present invention provides a camera module including a lens assembly including a liquid lens, an image sensor that receives light passing through the lens assembly, a detection sensor that detects a motion of the lens assembly to generate a motion signal, a voltage controller that generates a driving signal for adjusting an interface of the liquid lens in response to the motion signal, a detection unit that outputs a motion frequency from the motion signal, and a driving unit that changes an imaging timing of the image sensor according to the motion frequency.

The interface of the liquid lens may be periodically changed according to the motion frequency.

When the motion frequency increases, the driving unit may move the image timing form a minimum value of the motion sensor to an extreme value of the motion signal.

When the motion frequency deceases, the driving unit may move the imaging timing from an extreme value of the motion signal to a minimum value of the motion sensor.

The driving unit may move the imaging timing to a point at which an inclination of the motion signal is maximum.

The motion frequency may be greater than a frequency of a wavefront error for the interface of the liquid lens.

A magnitude of the wavefront error may have a constant number or section during one period even when the frequency of the motion signal is changed.

The image sensor may perform imaging at the imaging timing.

The interface of the liquid lens may be changed by the driving signal.

A wavefront error for the interface of the liquid lens may be changed according to a magnitude of the motion frequency.

Advantageous Effects

According to embodiments, a camera module that corrects an error due to optical image stabilization (OIS) can be implemented.

Further, a camera in which a wavefront error (WFE) is minimized can be implemented.

Various and beneficial advantages and effects of the present invention are not limited to the above description, and will be more easily understood in a process of describing specific embodiments of the present invention.

DESCRIPTION OF DRAWINGS

FIGS. 7A and 7B are views illustrating a structure of the liquid lens unit;

MODES OF THE INVENTION

Hereinafter, exemplary embodiments of the present invention will be described in detail with reference to the accompanying drawings.

However, the technical spirit of the present invention is not limited to some described embodiments and may be implemented in various different forms, and one or more of components may be selectively combined or substituted between the embodiments within the scope of the technical spirit of the present invention.

Further, unless explicitly defined and described, terms (including technical and scientific terms) used in the embodiments of the present invention can be interpreted in a meaning that may be generally understood by those skilled in the art to which the present invention pertains. Terms generally used, such as terms defined in the dictionary, may be interpreted in consideration of the meaning of the context of the related technology.

Further, terms used in the embodiments of the present invention are for describing the embodiments and are not intended to limit the present invention.

In the present specification, a singular form may include a plural form unless specifically mentioned in a phrase, and when "at least one (or one or more) of A, B, and C" is described, one or more of all possible combinations of A, B, and C may be included.

Further, in the description of components of the embodiments of the present invention, the terms such as first, second, A, B, (a), and (b) may be used.

These terms are not used to delimit an essence, an order or sequence, and the like of a corresponding component but used merely to distinguish the corresponding component from other component(s).

Further, when it is described that a first component is "connected" or "coupled" to a second component, the first component may be "connected" or "coupled" to the second component with a third component therebetween as well as the first component may be directly connected or coupled to the second component.

Further, when it is described that a first component is formed or disposed "above" or "below" a second component, the terms "above" and "below" include that one or more third components may be formed or arranged between the first and second components as well as the first and second components may be in direct contact with each other. Further, when the "above or below" is expressed, the "above or below" may include the meanings of a downward direction as well as an upward direction based on one component.

Figure 1:
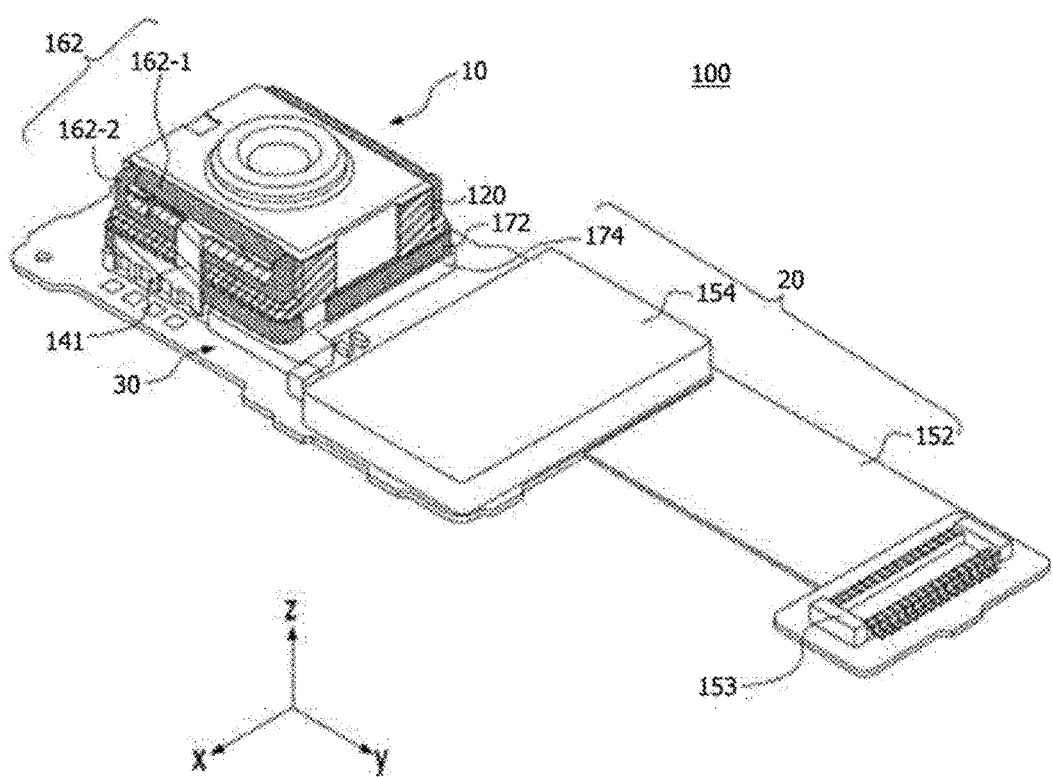
FIG. 1 is a schematic perspective view of a camera module according to an embodiment.

FIG. 1 is a schematic perspective view of a camera module according to an embodiment.

Referring to FIG. 1, a camera module 100 may include a lens assembly 10, a control circuit 20, and an image sensor 30.

First, the lens assembly 10 may include a plurality of lens units and a holder accommodating the plurality of lens units. As described above, the plurality of lens units may include a liquid lens and may further include a first lens unit or a second lens unit. The plurality of lens units may include the first lens unit, the second lens unit, and a liquid lens unit.

The control circuit 20 serves to supply a driving voltage (or an operating voltage) to the liquid lens unit.

The control circuit 20 and the image sensor 30 may be arranged on a single printed circuit board (PCB), but this is merely an example, and the embodiments are not limited thereto.

When the camera module 100 according to the embodiment is applied to an optical device, a configuration of the control circuit 20 may be designed differently according to specifications required by the optical device. In particular, the control circuit may be implemented as a single chip and reduce the magnitude of the driving voltage applied to the lens assembly 10. As a result, the size of the optical device mounted on a portable device may be further reduced. A detailed description thereof will be described below.

Figure 2:
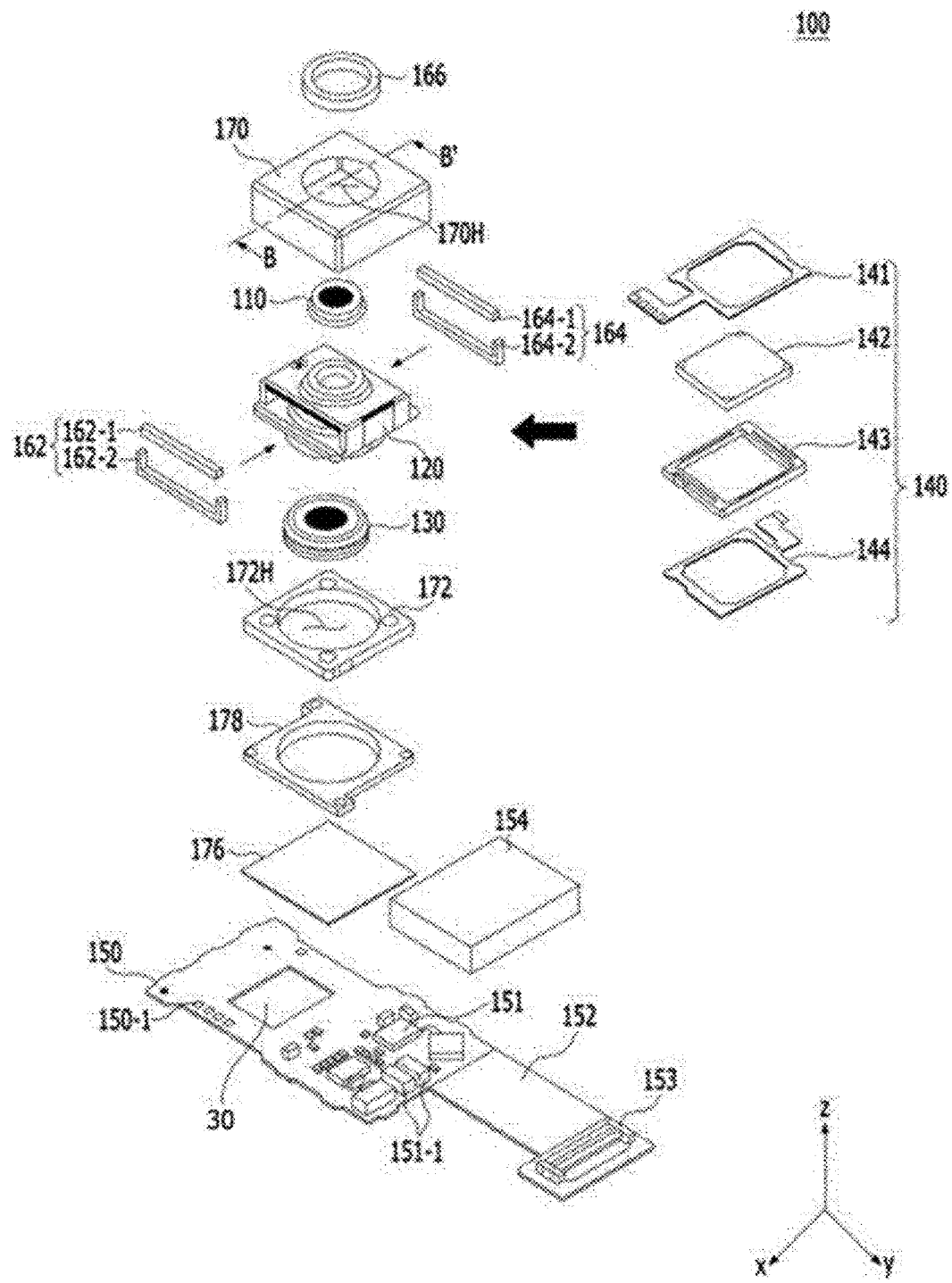
FIG. 2 is an exploded perspective view of the camera module according to an embodiment.
Figure 3:
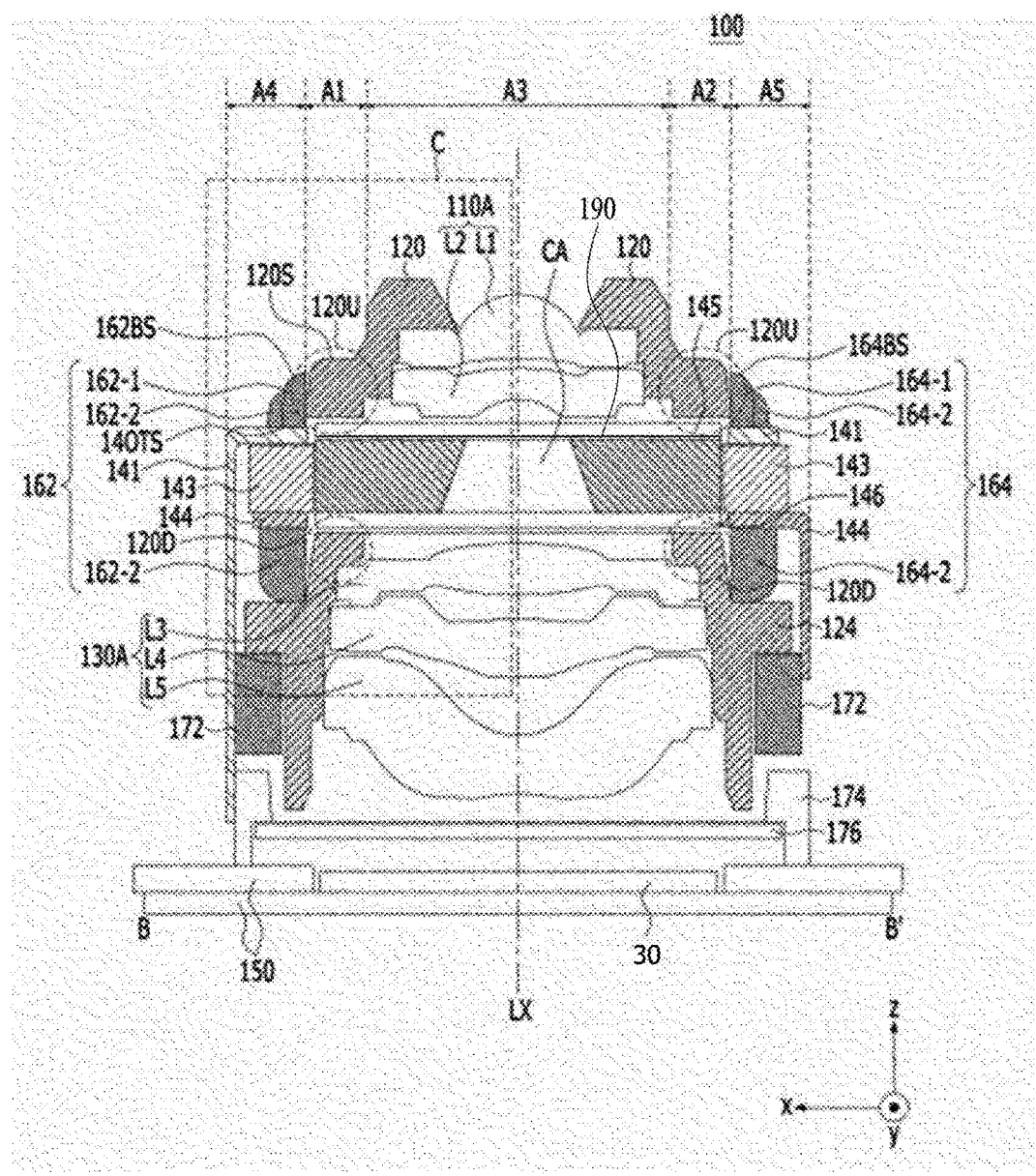
FIG. 3 is a cross-sectional view of the camera module according to an embodiment.
Figure 4:
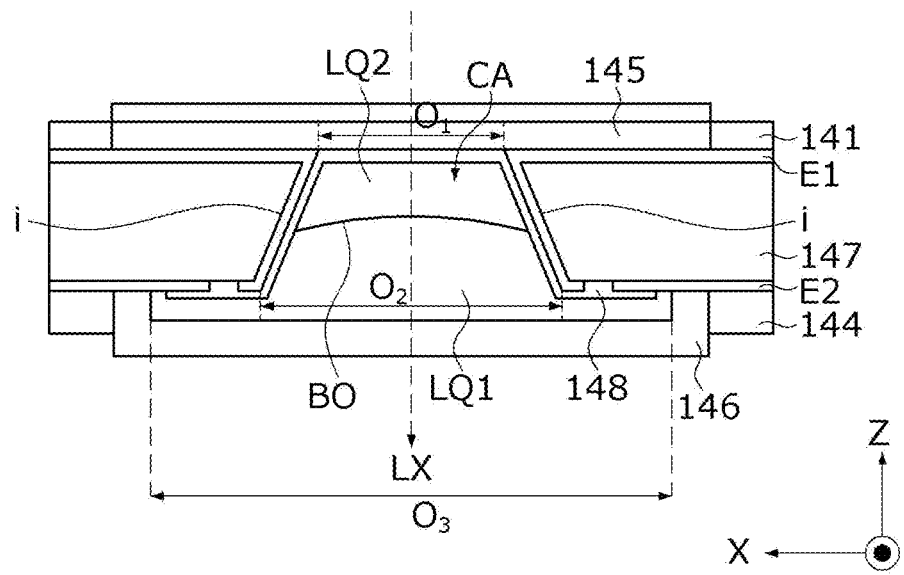
FIG. 4 is a cross-sectional view of a liquid lens unit according to an embodiment.

FIG. 2 is an exploded perspective view of the camera module according to an embodiment, FIG. 3 is a cross-sectional view of the camera module according to an embodiment, and FIG. 4 is a cross-sectional view of a liquid lens unit according to an embodiment.

Referring to FIGS. 2 and 3, the camera module 100 may include the lens assembly, a main substrate 150, and the image sensor 30. Further, the camera module 100 may further include a first cover 170 and a middle base 172. Further, the camera module 100 may further include at least one of adhesive members 162 and 164 and a second cover 174. The at least one adhesive member serves to couple or fix the liquid lens unit 140 to the holder 120.

Here, it is exemplified that the at least one adhesive member includes all of the first adhesive member 162, the second adhesive member 164, and a third adhesive member 166, but the embodiments are not limited thereto. That is, according to another embodiment, the at least one adhesive member may include only some of the first adhesive member 162, the second adhesive member 164, and the third adhesive member 166.

Further, according to the embodiment, at least one of components 110 to 190 of the camera module 100 illustrated in FIG. 2 may be omitted. Alternatively, the camera module 100 may further include at least one component different from the components 110 to 190 illustrated in FIG. 2.

For convenience of description, descriptions of the third adhesive member 166, the first cover 170, the second cover 174, and an optical layer 190 will be omitted.

Further, the lens assembly 10 (see FIG. 1) may include at least one of the liquid lens unit 140, the holder 120, the first lens unit 110 (i.e., 110A), the second lens unit 130 (i.e., 130A), the first adhesive member 162, the second adhesive member 164, and the third adhesive member 166. Further, the lens assembly may be disposed on the main substrate 150.

Further, in the lens assembly, in order to distinguish the first lens unit 110 (i.e., 110A) and the second lens unit 130 (i.e., 130A) from the liquid lens unit 140, the first lens unit 110 (i.e., 110A) may be referred to as a "first solid lens unit," and the second lens unit 130 (i.e., 130A) may be referred to as a "second solid lens unit."

The first lens unit 110 (i.e., 110A) may be a part which is disposed in an upper portion of the lens assembly and into which light is incident from the outside of the lens assembly. That is, the first lens unit 110 (i.e., 110A) may be disposed on the liquid lens unit 140 inside the holder 120. The first lens unit 110 (i.e., 110A) may be implemented as a single lens or may be implemented as two or more lenses arranged on a central axis to form an optical system. Here, the central axis may be an optical axis LX of the optical system formed by the first lens unit 110 (i.e., 110A), the liquid lens unit 140, and the second lens unit 130 (i.e., 130A) included in the camera module 100 or may be an axis parallel to the optical axis LX. The optical axis LX may be the same as an optical axis of the image sensor 30.

That is, the first lens unit 110 (i.e., 110A), the liquid lens unit 140, the second lens unit 130 (i.e., 130A), and the image sensor 30 may be arranged along the optical axis LX through an active alignment (AA). Here, the AA may be an operation in which, in order to obtain a better image, optical axes of the first lens unit 110 (i.e., 110A), the second lens unit 130 (i.e., 130A), and the liquid lens unit 140 are collinear with each other and an axis or distance relationship between the image sensor 30 and the lens units 110 (i.e., 110A), 130 (i.e., 130A), and 140 is adjusted.

In one embodiment, the AA may be performed through an operation of analyzing image data generated when the image sensor 30 receives light incident from a specific object through at least one of the first lens unit 110 (i.e., 110A), the second lens unit 130 (i.e., 130A), and the liquid lens unit 140. For example, the AA may be performed in the following order.

For example, after an AA (first alignment) of adjusting a relative location between the first lens unit 110 (i.e., 110A), the second lens unit 130 (i.e., 130A), and the image sensor 30 fixed to and mounted on the holder 120 is completed, an AA (second alignment) of adjusting a relative location between the liquid lens unit 140 and the image sensor 30 inserted into the holder 120 may be performed. The first alignment may be performed by a gripper who variously changes locations while the gripper holds the middle base 172, and the second alignment may be performed by the gripper who variously changes locations while the gripper holds s spacer 143 of the liquid lens unit 140. However, the AA may be performed in an order different from the above-described order.

Further, the holder 120 may include an upper holder region 120U disposed above the liquid lens unit 140 and a lower holder region 120D disposed below the liquid lens unit 140. In this case, the first adhesive member 162 and the second adhesive member 164 may couple the liquid lens unit 140 to the upper holder region 120U and the lower holder region 120D, respectively.

Further, when the first adhesive member 162 and the second adhesive member 164 are arranged, the liquid lens unit 140 may be stably fixed and coupled to the holder 120.

Further, the first lens unit 110A may include, for example, two lenses L1 and L2, but this is merely illustrative, and the number of lenses included in the first lens unit 110A may be one or more.

Further, an exposure lens may be disposed on an upper side of the first lens unit 110 (i.e., 110A). Here, the exposure lens may be an outermost lens among the lenses included in the first lens unit 110 (i.e., 110A). That is, the lens L1 located on the uppermost side of the first lens unit 110A is exposed to the upper side, and thus may function as the exposure lens. The exposure lens protrudes outward from the holder 120 and thus there is a possibility that a surface thereof may be damaged. When the surface of the exposure lens is damaged, the quality of an image captured by the camera module 100 may be degraded. Thus, in order to inhibit and suppress the damage to the surface of the exposure lens, a cover glass is disposed on the exposure lens, and a coating layer is formed on the exposure lens. Further, in order to inhibit the damage to the surface of the exposure lens, the exposure lens may be implemented using a wear-resistant material that is stronger than that of other lenses of the lens unit.

Further, the outer diameter of each of the lenses L1 and L2 included in the first lens unit 110A may increase toward the lower side (for example, in a −Z-axis direction), but the embodiments are not limited thereto.

The light incident from the outside of the camera module 100 to the first lens unit 110 (i.e., 110A) may pass through the liquid lens unit 140 to be incident on the second lens unit 130 (i.e., 130A). The second lens unit 130 (i.e., 130A) may be implemented as a single lens or may also be implemented as two or more lenses arranged on the central axis to form the optical system. For example, as illustrated in FIG. 3A, the second lens unit 130A may include three lenses L3, L4, and L5, but this is illustrative and the number of the lenses included in the second lens unit 130 (i.e., 130A) may be two or less or four or more.

Further, the outer diameter of each of the lenses L3, L4, and L5 included in the second lens unit 130A may increase toward the lower side (for example, in a —Z-axis direction), but the embodiments are not limited thereto.

Further, unlike the liquid lens unit 140, the first lens unit 110 (i.e., 110A) and the second lens unit 130 (i.e., 130A) are solid lenses and may be implemented using glass or plastic, but in the embodiments, the first lens unit 110 (i.e., 110A) and the second lens unit 130 (i.e., 130A) are not limited to specific materials.

Further, the liquid lens unit 140 may include first to fifth regions A1, A2, A3, A4, and A5. In detail, the fourth region A4 and the fifth region A5 may be located on the outermost side of the camera module 100, and the first region A1, the second region A2, and the third region A3 may be arranged between the fourth region A4 and the fifth region A5. Further, the third region A3 may be disposed between the first region A1 and the second region A2. Further, the first region A1 may be disposed between the fourth region A4 and the third region A3, and the second region A2 may be disposed between the third region A3 and the fifth region A5.

In other words, the first region A1 and the second region A2 may be regions arranged inside openings of a side surface of the holder 120. The third region A3 may be a region between the first region A1 and the second region A2. Further, the fourth region A4 and the fifth region A5 are regions protruding from the openings of the holder 120 and regions arranged in openings outside the holder 120.

Hereinafter, the first adhesive member 162 and the second adhesive member 164 are described, and the liquid lens unit 140 will be described below.

The first adhesive member 162 may include first and second adhesive parts 162-1 and 162-2, and the second adhesive member 164 may include third and fourth adhesive parts 164-1 and 164-2. The adhesive parts may include an adhesive, an epoxy, or the like.

First, the first adhesive part 162-1 couples the holder 120 to an upper surface 140TS of the fourth region A4 of the liquid lens unit 140, and the third adhesive part 164-1 couples the holder 120 to an upper surface of the fifth region A5 of the liquid lens unit 140. Here, the upper surface 140TS of each of the fourth region A4 and the fifth region A5 of the liquid lens unit 140 is exemplified as an upper surface of a first connection substrate 141, but the embodiments are not limited thereto. For example, when the liquid lens unit 140 does not include connection substrates 141 and 144 or the spacer 143, an upper surface of the liquid lens unit 140 may be an upper surface of a liquid lens 142.

Alternatively, the holder 120 may include an upper holder disposed on the liquid lens unit 140 (or the liquid lens 142) and a lower holder disposed under the liquid lens unit 140 (or the liquid lens 142). Further, the holder 120 may include a side wall facing a side surface of the liquid lens 142 or the liquid lens unit 140. Each of the first adhesive part 162-1 and the third adhesive part 164-1 may couple the upper holder region 120U and the liquid lens unit 140. In this way, each of the first adhesive part 162-1 and the third adhesive part 164-1 couples the holder 120 and the liquid lens unit 140, and thus the liquid lens unit 140 may be fixed to the holder 120.

Further, the second adhesive part 162-2 may couple the holder 120 to a lower surface 140BS and a side surface of the fourth region A4 of the liquid lens unit 140. Here, it is exemplified that the lower surface 140BS of the liquid lens unit 140 is a lower surface of the second connection substrate 144, and the side surface of the liquid lens unit 140 is a side surface of the spacer 143, but the embodiments are not limited thereto. For example, when the liquid lens unit 140 does not include the first connection substrate 141 and the second connection substrate 144 or the spacer 143, the lower surface or side surface of the liquid lens unit 140 may be a lower surface or side surface of the liquid lens 142. Similarly, the fourth adhesive part 164-2 may couple the holder 120 to the lower surface 140BS and a side surface 140SS of the fifth region A5 of the liquid lens unit 140. Here, the lower surface 140BS of the liquid lens unit 140 may be the lower surface of the second connection substrate 144, and the side surface 140SS of the liquid lens unit 140 may be the side surface of the spacer 143, but the embodiments are not limited thereto. For example, when the liquid lens unit 140 does not include the connection substrates 141 and 144 or the spacer 143, the lower surface or side surface of the liquid lens unit 140 may be the lower surface or side surface of the liquid lens 142.

Further, each of the second adhesive part 162-2 and the fourth adhesive part 164-2 may couple the lower holder region 120D and the liquid lens unit 140. In this way, each of the second adhesive part 162-2 and the fourth adhesive part 164-2 couples the holder 120 and the liquid lens unit 140, and thus an opening of the holder 120 may be sealed. For example, the first adhesive part 162-1 and the second adhesive part 162-2 may be connected to each other, and the third adhesive part 164-1 and the fourth adhesive part 164-2 are connected to each other, thereby achieving the above sealing.

Although not illustrated, the third adhesive member 166 may be disposed to fill a separation space (or a gap) between an upper surface of the holder 120 and the first cover 170. Further, in some cases, the third adhesive member 166 may be omitted. In this case, the separation space between the upper surface of the holder 120 and the first cover 170 may be empty.

The embodiments are not limited to the above-described shapes of the first to third adhesive members 162, 164, and 166. That is, the first to third adhesive members 162, 164, and 166 may have various shapes as long as the interior of the holder 120 may be sealed so that foreign substances do not flow into the holder 120 through an opening of the holder 120 from the outside. For example, in a state in which the first adhesive member 162 and the second adhesive member 164 are arranged to seal the opening of the holder 120, when the third adhesive member 166 is disposed to seal the separation space between the upper surface of the holder 120 and the first cover 170, the third region A3 of the liquid lens unit 140 disposed in an inner space of the holder 120 may be sealed from the outside. Accordingly, in the camera module 100 according to an embodiment, the reliability can be improved, the degradation of optical performance can be inhibited, and a defective rate can be reduced even when there are foreign substances.

Further, the first adhesive part to the fourth adhesive part 162-1, 164-1, 162-2, and 164-2 may have various shapes. That is, the first adhesive part 162-1, the second adhesive part 162-2, the third adhesive part 164-1, and the fourth adhesive part 164-2 may have shapes corresponding to the shapes of the openings of the holder 120.

Further, adhesives may be disposed in the first region A1 and the second region A2 together with the fourth region A4 and the fifth region A5, but the embodiments are not limited thereto.

Further, the first cover 170 may be disposed to surround the holder 120, the liquid lens unit 140, the middle base 172, and a sensor base 178. Accordingly, the first cover 170 may be in contact with a shoulder-side upper surface 120S of the holder 120. In this case, when an upper surface 162S of each of the first adhesive part 162-1 and the third adhesive part 164-1 is located at a higher level than the shoulder-side upper surface 120S of the holder 120, the first cover 170 may be in contact with the upper surface 162S of each of the first adhesive part 162-1 and the third adhesive part 164-1 instead of the shoulder-side upper surface 120S of the holder 120. Accordingly, the first cover 170 may be unstably fixed to the holder 120. To inhibit this, the upper surface 120S of the holder 120 may be disposed so that the upper surface 120S and the upper surface 162S of the first adhesive part 162-1 are located at different levels by a predetermined height. Similarly, the upper surface 120S of the holder 120 may be located at a higher level than the upper surface 164S of the third adhesive part 164-1 by a predetermined height.

Further, the height of the upper surface 120S of the holder 120 may be the same as the height of the upper surface 162S of the first adhesive part 162-1, and the height of the upper surface S120 of the holder 120 may be the same as the height of the upper surface 164S of the third adhesive part 164-1.

Further, hereinabove, the liquid lens unit 140 described when features of the first adhesive member 162 and the second adhesive member 164 are described includes the first and second connection substrates 141 and 144. However, the liquid lens unit 140 described when features of the first adhesive member 162 and the second adhesive member 164 are described above may not include the first and second connection substrates 141 and 144.

Further, the first cover 170 is disposed to surround the holder 120, the liquid lens unit 140, the third adhesive member 166, and the middle base 172 and thus may protect the holder 120, the liquid lens unit 140, the third adhesive member 166, and the middle base 172 from an external impact. In particular, the first cover 170 is disposed and thus may protect the plurality of lenses forming the optical system.

Further, the first cover 170 may include an upper opening 170H formed in an upper surface thereof. Accordingly, the first lens unit 110 (i.e., 110A) disposed in the holder 120 may be exposed to external light.

Further, the middle base 172 may be disposed to surround a hole of the holder 120. Accordingly, the middle base 172 may include an accommodation hole 172H for accommodating the hole of the holder 120. The inner diameter (that is, the diameter of the accommodation hole 172H) of the middle base 172 may be greater than or equal to an outer diameter of the holder 120. Further, it is illustrated that the accommodation hole 172H of the middle base 172 and the hole of the holder 120 have circular shapes, but the embodiments are not limited thereto, and the accommodation hole 172H of the middle base 172 and the hole of the holder 120 may be changed into various shapes. Further, the middle base 172 may be mounted on the main substrate 150 while being spaced apart from a circuit element 151 on the main substrate 150.

Like the upper opening 170H of the first cover 170, the accommodation hole 172H may be formed at a location corresponding to a location of the image sensor 30 disposed in the camera module 100 near a central portion of the middle base 172.

Further, the camera module 100 may further include the sensor base 178 and a filter 176 and further include a circuit cover 154.

The filter 175 may filter the light passing through the first lens unit 110 (i.e., 110A), the liquid lens unit 140, and the second lens unit 130 (i.e., 130A) into a specific wavelength range. The filter 176 may be an infrared ray (IR) cut-off filter or an ultraviolet (UV) cut-off locking filter, but the embodiments are not limited thereto.

Further, the filter 176 may be disposed above the image sensor 30. The filter 176 may be disposed inside the sensor base 178. For example, the filter 176 may be disposed or mounted in an inner groove or step of the sensor base 178.

The sensor base 178 may be disposed below the middle base 172 and attached to the main substrate 150. The sensor base 178 may surround the image sensor 30 and protect the image sensor 30 from external foreign substances or an external impact.

Next, the main substrate 150 is disposed below the middle base 172 and may include a groove which the image sensor 30 is mounted on, is seated on, is in contact with, is fixed to, is temporarily fixed to, is supported by, is coupled to, or is accommodated in, the circuit element 151, a connection part (or a flexible printed circuit board (FPCB)) 152, and a connector 153.

In detail, the main substrate 150 may include a holder region in which the holder 120 is disposed and an element region in which a plurality of circuit elements 151 are arranged.

The main substrate 150 may be implemented as a rigid flexible printed circuit board (RFPCB) including the FPCB 152. The FPCB 152 may be bent for a space on which the camera module 100 is mounted.

Further, the circuit element 151 of the main substrate 150 may constitute a control module that controls the liquid lens unit 140 and the image sensor 30. Here, the control module will be described below.

Further, the circuit element 151 may include at least one of a passive element and an active element and may have various widths and heights. The circuit element 151 may be provided as a plurality of circuit elements 151 and may protrude outward while having a height that is greater than the height of the main substrate 150. The plurality of circuit elements 151 may be arranged so as not to overlap the holder 120 in a direction parallel to the optical axis LX. For example, the plurality of circuit elements 151 may each include a power inductor, a gyro sensor, and the like, but the embodiments are limited to a specific type of the circuit elements 151.

The circuit cover 154 may be disposed to cover the circuit elements 151. Accordingly, the circuit cover 154 may protect the circuit elements 151 arranged on the main substrate 150 from an external impact. Further, to this end, the circuit cover 154 may include an accommodation space for accommodating the circuit element 151 to be covered by the circuit cover 154 in consideration of the shape and location of the circuit element 151 disposed on the main substrate 150. Further, the circuit cover 154 may perform an electromagnetic shielding function.

The image sensor 30 may function to convert, into image data, the light passing through the first lens unit 110 (i.e., 110A), the liquid lens unit 140, and the second lens unit 130 (i.e., 130A) of the lens assemblies 110, 120, 130, 140, 162, and 164. In more detail, the image sensor 30 may convert the light into an analog signal through a pixel array including a plurality of pixels and synthesize a digital signal corresponding to the analog signal to generate the image data.

Referring to FIGS. 3 and 4, the liquid lens unit 140 may include the first connection substrate (or an individual electrode connection substrate) 141, the liquid lens (or a liquid lens body) 142, the spacer 143, and the second connection substrate (or a common electrode connection substrate) 144.

The first connection substrate 141 may electrically connect a plurality of first electrodes (not illustrated) included in the liquid lens 142 to the main substrate 150 and may be disposed on the liquid lens 142. The first connection substrate 141 may be provided as a FPCB.

Further, the first connection substrate 141 may be electrically connected to an electrode pad 150-1 formed on the main substrate 150 through a connection pad 141-1 electrically connected to each of the plurality of first electrodes. To this end, after the liquid lens unit 140 is inserted into the inner space of the holder 120, the first connection substrate 141 is bend in a —Z-axis direction toward the main substrate 150, and then the connection pad 141-1 and the electrode pad 150-1 may be electrically connected using a conductive epoxy. In another embodiment, the first connection substrate 141 may be connected to a first conductive holder surface electrode, which is disposed, formed, or applied on a surface of the holder 120, and may be electrically connected to the main substrate 150 through the first conductive holder surface electrode disposed on the surface of the holder 120, but the embodiments are not limited thereto.

The second connection substrate 144 may electrically connect a second electrode (not illustrated) included in the liquid lens 142 to the main substrate 150 and may be disposed under the liquid lens 142. The second connection substrate 144 may be implemented as an FPCB or a single metal substrate (conductive metal plate).

Further, the second connection substrate 144 may be electrically connected to an electrode pad formed on the main substrate 150 through a connection pad electrically connected to the second electrode. To this end, after the liquid lens unit 140 is inserted into the inner space of the holder 120, the second connection substrate 144 may be bent in a —Z-axis direction toward the main substrate 150. In another embodiment, the second connection substrate 144 may be connected to a conductive surface electrode, which is disposed, formed, or applied on the surface of the holder 120, and may be electrically connected to the main substrate 150 through the conductive surface electrode disposed on the surface of the holder 120, but the embodiments are not limited thereto.

The liquid lens 142 may include a cavity CA. Further, an opening area of the cavity CA in a direction in which the light is incident may be smaller than an opening area thereof in an opposite direction. Alternatively, the liquid lens 142 may be disposed so that an inclination direction of the cavity CA is reversed. That is, the opening area of the cavity CA in the direction in which the light is incident may be also greater than the opening area thereof in an opposite direction. Further, when the liquid lens 142 is disposed so that the inclination direction of the cavity CA is reversed, according to the inclination direction of the liquid lens 142, the arrangement of the entirety or a part of the components included in the liquid lens 142 may be changed or only the inclination direction of the cavity CA is changed and the arrangement of the remaining components may not be changed.

The spacer 143 may be disposed to surround the liquid lens 142 and protect the liquid lens 142 from an external impact. To this end, the spacer 143 may have a shape which the liquid lens 142 may be mounted in, seated on, in contact with, fixed to, temporarily fixed to, supported by, coupled to, or disposed in.

For example, the spacer 143 may include a hollow 143H accommodating the liquid lens 142 and a frame surrounding the hollow 143H formed in the middle thereof. In this way, the spacer 143 may have a quadrangular planar shape having a hollow center (hereinafter, referred to as a "□" shape), but the embodiments are not limited thereto.

Further, the spacer 143 may be disposed between the first connection substrate 141 and the second connection substrate 144 and may protrude from the opening of the holder 120.

Further, the liquid lens 142 may include a plurality of different liquids LQ1 and LQ2, first to third plates 147, 145, and 146, first and second electrodes E1 and E2, and an insulating layer 148. The liquid lens 142 may further include an optical layer 190.

Further, the plurality of liquids LQ1 and LQ2 may be accommodated in the cavity CA and may include a first conductive liquid LQ1 and a second non-conductive liquid (or an insulating liquid) LQ2. Further, the first liquid LQ1 and the second liquid LQ2 are not mixed with each other, and an interface BO may be formed at a portion at which the first liquid LQ1 is in contact with the second liquid LQ2. Further, the second liquid LQ2 may be disposed on the first liquid LQ1, but the embodiments are not limited thereto.

Further, in a cross-sectional shape of the liquid lens 142, edges of the first and second liquids LQ1 and LQ2 may be thinner than a central portion thereof. However, the embodiments are not limited. Further, the first liquid LQ1 may be an oil. The inner surface of the first plate 147 may form a side wall i of the cavity CA. The first plate 147 may include upper and lower openings having a preset inclined surface. That is, the cavity CA may have a region surrounded by the inclined surface of the first plate 147, the second plate 145, and the third plate 146.

Further, according to the embodiments, the size (or area or width) O1 of the upper opening may be greater than the size (or area or width) O2 of the lower opening. Here, the size of each of the upper opening and the lower opening may be a cross-sectional area in a horizontal direction (for example, in an X-axis direction and a Y-axis direction). For example, further, the size of the opening may be a radius when the cross-section of the opening has a circular shape and may be a length of a diagonal line when the cross-section of the opening is square. Further, the diameter of the opening may be changed according to a field of view (FOV) required by the liquid lens 142 or a role that the liquid lens 142 should perform in the camera module 100.

Further, each of the openings may have a shape of a hole having a circular cross-section, and the interface BO may be moved along an inclined surface of the cavity CA by the driving voltage.

Further, as described above, the first liquid LQ1 and the second liquid LQ2 may fill, be accommodated, and be arranged in the cavity CA. Further, the cavity CA is a portion through which the light passing through the first lens unit 110 (i.e., 110A) passes. Further, the first plate 147 is located outside the cavity CA and thus may be formed of a transparent material. As well, the first plate 147 may also include impurities so that the light does not easily pass therethrough.

Further, electrodes may be arranged on one surface and the other surface of the first plate 147. The plurality of first electrodes E1 may be arranged to be spaced apart from the second electrode E2 and may be arranged on the one surface (for example, an upper surface, a side surface, and a lower surface) of the first plate 147. The second electrode E2 may be disposed in at least a portion of the other surface (for example, a lower surface) of the first plate 147 and may be in direct contact with the first liquid LQ1.

Further, the first electrodes E1 may be n electrodes (hereinafter, referred to as "individual electrodes") and the number of the second electrodes E2 may be one (hereinafter, referred to as a "common electrode"). Here, n may be an integer of two or more. Here, a case in which the number of the first electrodes E1 is four and the number of the second electrodes E2 is one will be described below. That is, opposite ends electrically connected to the liquid lens 142 may be one of the plurality of first electrodes E1 and the second electrode E2.

Further, a portion (that is, an electrode sector of the second electrode E2) of the second electrode E2 disposed on the other surface of the first plate 147 may be exposed to the first liquid LQ1 having conductivity.

Each of the first and second electrodes E1 and E2 may be made of a conductive material. Further, the second plate 145 may be disposed on one surface of the first electrode E1. That is, the second plate 145 may be disposed on the first plate 147. In detail, the second plate 145 may be disposed on an upper surface of the first electrode E1 and the cavity CA.

The third plate 146 may be disposed on one surface of the second electrode E2. That is, the third plate 146 may be disposed under the first plate 147. In detail, the third plate 146 may be disposed under a lower surface of the second electrode E2 and the cavity CA.

The second plate 145 and the third plate 146 may be arranged to be opposite to each other with the first plate 147 interposed therebetween. Further, at least one of the second plate 145 and the third plate 146 may be omitted.

At least one of the second and third plates 145 and 146 may have a quadrangular planar shape. The third plate 146 may be in contact with and adhere to a joining region at an edge of the first plate 147.

The second plate 145 and the third plate 146 are regions through which the light passes and may be formed of a light-transmitting material. For example, the second and third plates 145 and 146 may be made of glass and may be formed of the same material for convenience of processing. Further, edges of each of the second and third plates 145 and 146 may have a quadrangular shape, but the embodiments are not necessarily limited thereto.

Further, the second plate 145 may allow the light incident from the first lens unit 110 (i.e., 110A) to move into the cavity CA of the first plate 147.

Further, the third plate 146 may allow the light passing through the cavity CA of the first plate 147 to move to the second lens unit 130 (i.e., 130A). The third plate 146 may be in direct contact with the first liquid LQ1.

According to the embodiment, the third plate 146 may have a diameter greater than a diameter of a wider opening among the upper opening and the lower opening of the first plate 147. Further, the third plate 146 may include a peripheral region spaced apart from the first plate 147.

For example, an actual effective lens region of the liquid lens 142 may be smaller than a diameter (for example, O2) of a wider opening among the upper opening and the lower opening of the first plate 147. That is, when a radius of a narrow range with respect to the center of the liquid lens 142 is used as a path along which the light is actually transmitted, a diameter O3 of a central region of the third plate 146 may be smaller than a diameter (for example, O2) of a wider opening among a third opening and a fourth opening of the first plate 147.

The insulating layer 148 may be disposed to cover a portion of a lower surface of the second plate 145 in an upper region of the cavity CA. That is, the insulating layer 148 may be disposed between the second liquid LQ2 and the second plate 145.

Further, the insulating layer 148 may be disposed to cover a portion of the first electrode E1 constituting a side wall of the cavity CA. Further, the insulating layer 148 may be disposed on the lower surface of the first plate 147 to cover a portion of the first electrode E1, the first plate 147, and the second electrode E2. Accordingly, contact between the first electrode E1 and the first liquid LQ1 and contact between the first electrode and the second liquid LQ2 may be cut off by the insulating layer 148.

The insulating layer 148 may cover one electrode (for example, the first electrode E1) among the first electrode E1 and the second electrode E2, may expose a portion of the other electrode (for example, the second electrode E2) thereof, and thus may allow electrical energy to be applied to the first liquid LQ1 having conductivity.

Meanwhile, the optical layer 190 may be disposed on one surface of at least one of the second plate 145 or the third plate 146. For example, the optical layer 190 may be disposed on at least one of an upper side or a lower side of the second plate 145, may be disposed on at least one of an upper side and a lower side of the third plate 146, or may be disposed on at least one of the upper sides and the lower sides of the second and third plates 145 and 146.

Further, although the liquid lens 142 and the optical layer 190 are illustrated separately from each other, the optical layer 190 may be a component of the liquid lens 142. Further, the optical layer 190 is illustrated as a single layer, but this is for displaying the existence of the optical layer 190. That is, the optical layer 190 may be a single layer or multiple layers.

Further, the optical layer 190 may include at least one of an UV cut-off layer, an anti-reflective layer, and an IR cut-off layer. The optical layer 190 may be disposed to overlap the image sensor 30 in a direction of the optical axis LX (that is, a Z axis) or in a direction parallel to the direction of the optical axis. Further, the optical layer 190 may be disposed in the third region A3 of the liquid lens unit 140. For example, the UV cut-off layer may cut off UV rays, particularly, light in a UV-A region. The UV cut-off layer may be disposed in a region in which the light incident on the liquid lens 142 and cut off the UV rays, particularly, the light in the UV-A region, which may be transmitted from the first lens unit 110 (i.e., 110A). UV-C has a relatively short wavelength and has low penetration power, and thus most of the UV-C is cut off by the ozone layer. UV-B is cut off by general glass. However, the UV-A passes through general glass, and thus a separate cut-off layer may be particularly required. Further, the UV cut-off layer may include at least one of $TiO_2$, $SiO_2$, avobenzone, butylmethoxy dibenzoyl-methane, oxybenzone, benzophenone-3, cinnamate, and mexoryl.

Further, the anti-reflective layer may serve to inhibit the light from being reflected by the second plate 145 or the third plate 146, may improve light transmittance that may be decreased due to a Fresnel loss in the liquid lens 142, and may inhibit a decrease in night visibility of the liquid lens 142. In particular, although not illustrated, the anti-reflective layer may be disposed on an inclined surface and a lower surface of the insulating layer 148, and the anti-reflective layer may inhibit a decrease in the quality of the light that is reflected and transmitted to the image sensor 30.

Further, the IR cut-off layer may cut off the light in an IR region. The IR cut-off layer may inhibit the IR from being incident on the liquid lens 142 from the outside to remove thermal stains on an image and may reduce reflection of light from the surface of the liquid lens 142 to inhibit degradation of night visibility.

Further, at least one of the UV cut-of layer, the anti-reflective layer, and the IR cut-off layer may be disposed in at least one of a light input part and a light output part of the camera module 100 according to the embodiment.

Further, according to the embodiment, the optical layer 190 may have a coated form or a film form. For example, the anti-reflective layer of the optical layer 190 may be formed by coating at a low temperature in a spraying method or the like.

FIGS. 5A to 5E are views for describing a method of driving the liquid lens unit. Hereinafter, it will be described that a voltage is applied between the first electrode and the second electrode.

Figure 5A:
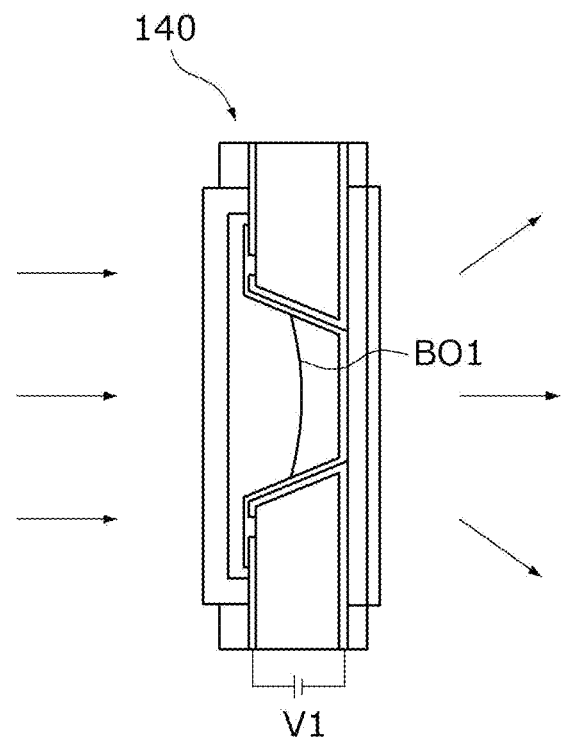
FIGS. 5A to 5E are views for describing a method of driving the liquid lens unit.

First, in FIG. 5A, a first voltage V1 is applied to the liquid lens unit 140, and thus an interface BO1 of the liquid lens may be convex in a light propagation direction. Accordingly, it is exemplified that the liquid lens unit operates as a concave lens. Further, in FIG. 5B, a second voltage V2 greater than the first voltage V1 is applied to the liquid lens unit 140, and thus an interface BO2 of the liquid lens may be perpendicular to the light propagation direction. Accordingly, it is exemplified that, in the liquid lens unit, the light propagation direction is not changed. Further, in FIG. 5C, a third voltage V3 greater than the second voltage V2 is applied to the liquid lens unit 140, and thus an interface BO3 of the liquid lens may be convex in a direction opposite to the light propagation direction. Accordingly, it is exemplified that the liquid lens unit 140 operates as a convex lens. In this case, when the first voltage V1 to the third voltage V3 are applied, the interfaces BO1, BO2, and BO3 of the liquid lens in the liquid lens unit 140 may have different curvatures.

That is, in the liquid lens unit 140 according to the embodiment, it is exemplified that the curvature or diopter of the liquid lens of the liquid lens unit is changed according to the level of the applied voltage, but the embodiments are not limited thereto, and the curvature or diopter of the liquid lens may be changed according to a pulse width of an applied pulse.

Figure 5B:
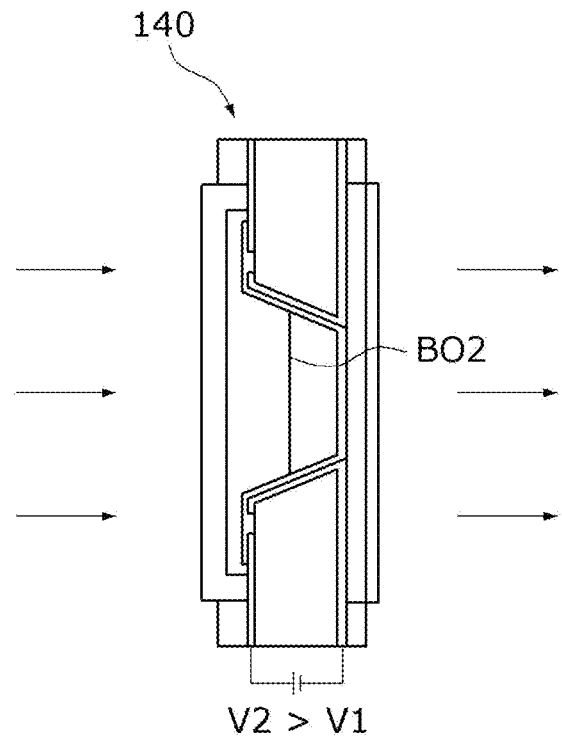
Figure 5C:
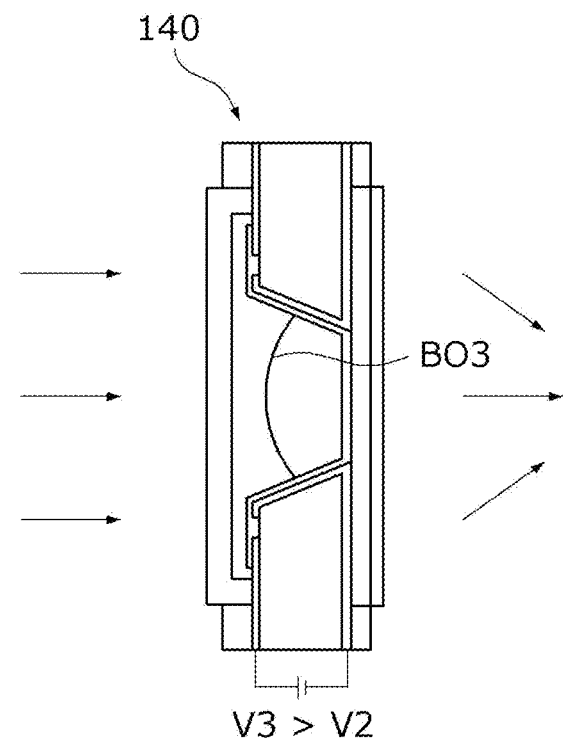
Figure 5D:
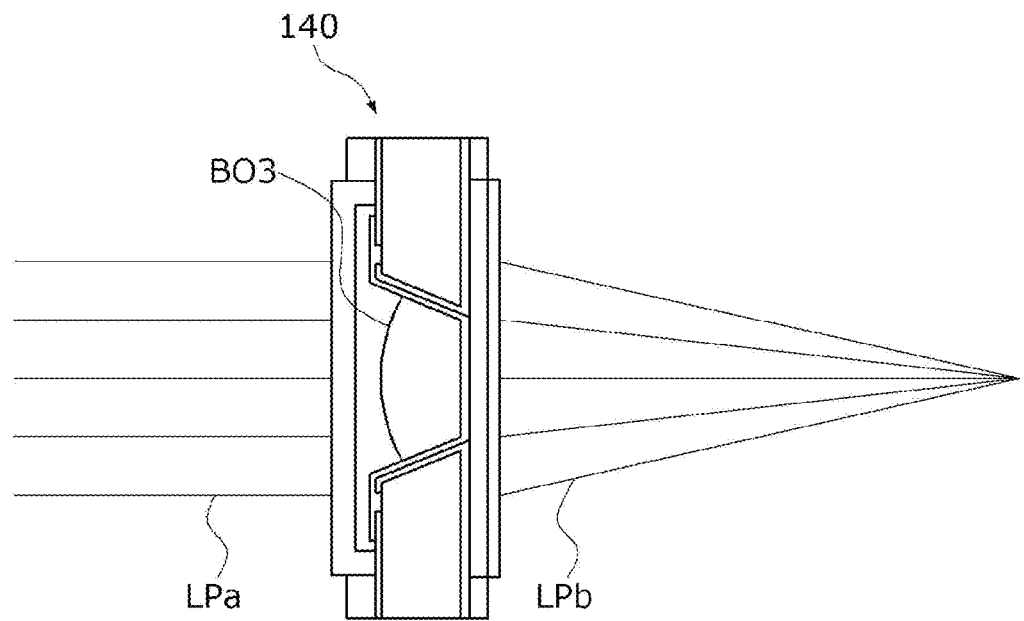

Further, in FIG. 5D, it is exemplified that the liquid lens of the liquid lens unit 140 has the same curvature of the interface BO3 as that of FIG. 5C, and thus liquid lens unit 140 operates as a convex lens. Accordingly, according to FIG. 5D, an incident light LPa is concentrated, and a corresponding output light LPb is output.

Figure 5E:
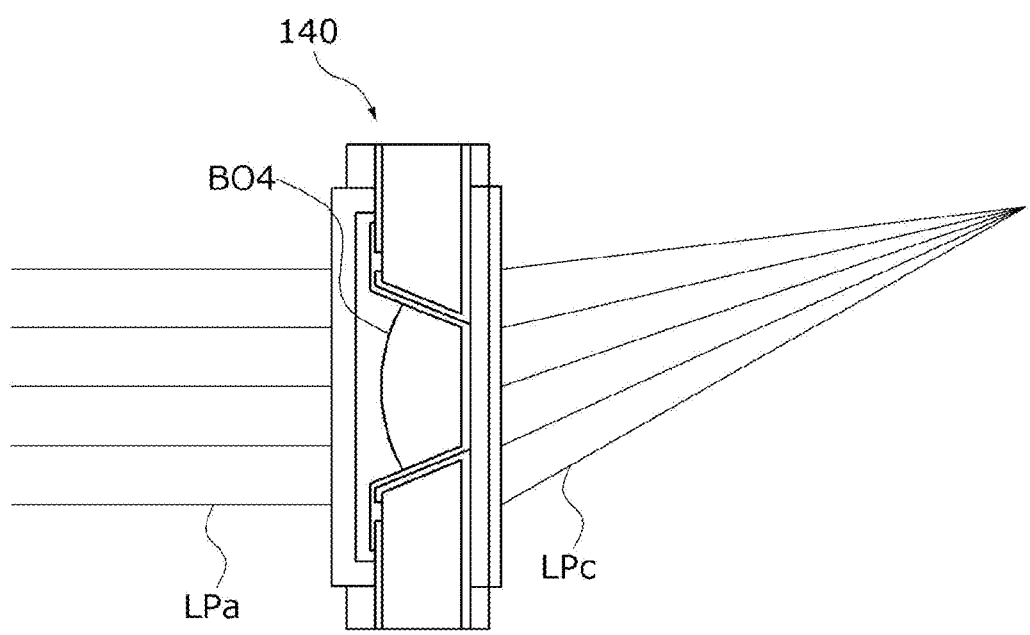

Further, FIG. 5E illustrates a state in which, as the liquid lens in the liquid lens unit 140 has an asymmetrical curved surface (for example, the interface is convex in the direction opposite to the light propagation direction from the above), the light propagation direction is changed to one side (for example, an upper side). That is, according to FIG. 5D, an incident light LPa is concentrated to the upper side, and a corresponding output light LPb is output.

Figure 6:
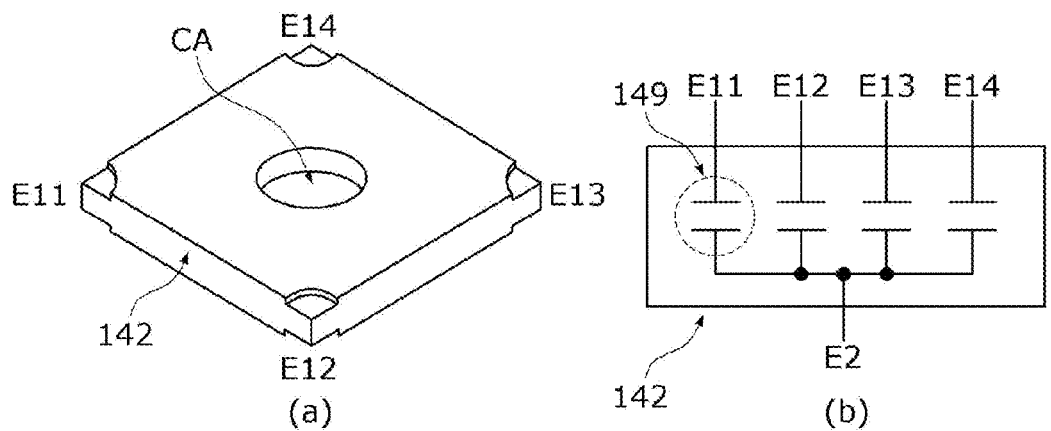
FIG. 6 is a view for describing the liquid lens unit of which an interface is adjusted according to a driving voltage.

FIG. 6 is a view for describing the liquid lens unit of which an interface is adjusted according to a driving voltage.

Referring to FIG. 6, FIG. 6A describes the liquid lens unit, and FIG. 5B describes an equivalent circuit of the liquid lens unit.

Referring to FIG. 6A, a lens 28 of which a focal length is adjusted according to the driving voltage may receive a voltage through individual terminals E11, E12, E13, and E14 having the same angular distance and arranged in four different directions. The individual terminals may be arranged to have the same angular distance with respect to a central axis of the liquid lens and may include four individual terminals. The four individual terminals may each be arranged at one of four corners of the liquid lens. When the voltage is applied through the individual terminals E11, E12, E13, and E14, the interface of the liquid lens may be deformed by the driving voltage formed by an interaction between the applied voltage and a voltage applied to a common terminal CO described below.

Further, referring to FIG. 6B, one side of the liquid lens 142 may receive operating voltages from the different individual terminals E11, E12, E13, and E14, and the other side thereof may be electrically connected to the common terminal CO. Further, the common terminal CO and a plurality of capacitors 149 may be connected. Further, the plurality of capacitors 149 included in the equivalent circuit may have a small capacitance of about several tens to 200 pF. A terminal of the liquid lens may be called an electrode sector or a sub electrode.

Figure 7A:
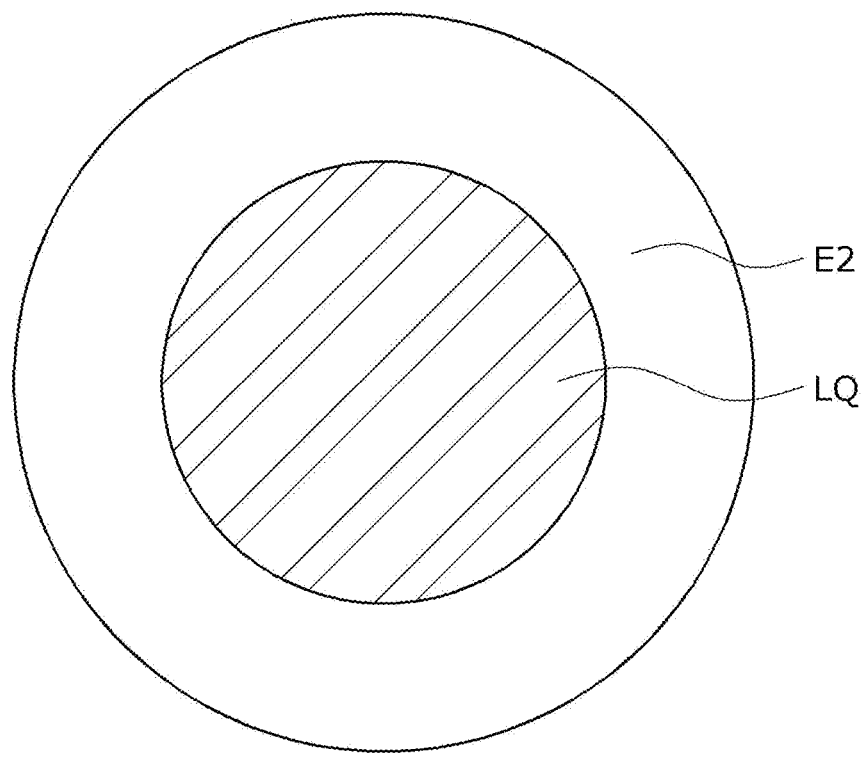

FIGS. 7A and 7B are views illustrating a structure of the liquid lens unit.

Referring to FIG. 7A, the common electrode E2 (corresponding to the second electrode) may be disposed on one side of the liquid lens unit 140. In this case, the common electrode E2 may be disposed in a tube shape, and a liquid LQ may be disposed in a lower region of the common electrode E2, particularly, in a region corresponding to a hollow.

Meanwhile, although not illustrated in the drawings, the insulating layer may be disposed between the common electrode E2 and the liquid to insulate the common electrode E2.

Further, as illustrated in FIG. 7B, a plurality of first electrodes E11 to E14 may be arranged below the common electrode, particularly, below the liquid LQ. In particular, the plurality of first electrodes E11 to E14 may be arranged to surround the liquid LQ.

Further, a plurality of insulating layers 148a to 149d for insulation may be arranged between the plurality of first electrodes E11 to E14 and the liquid LQ.

Figure 8:
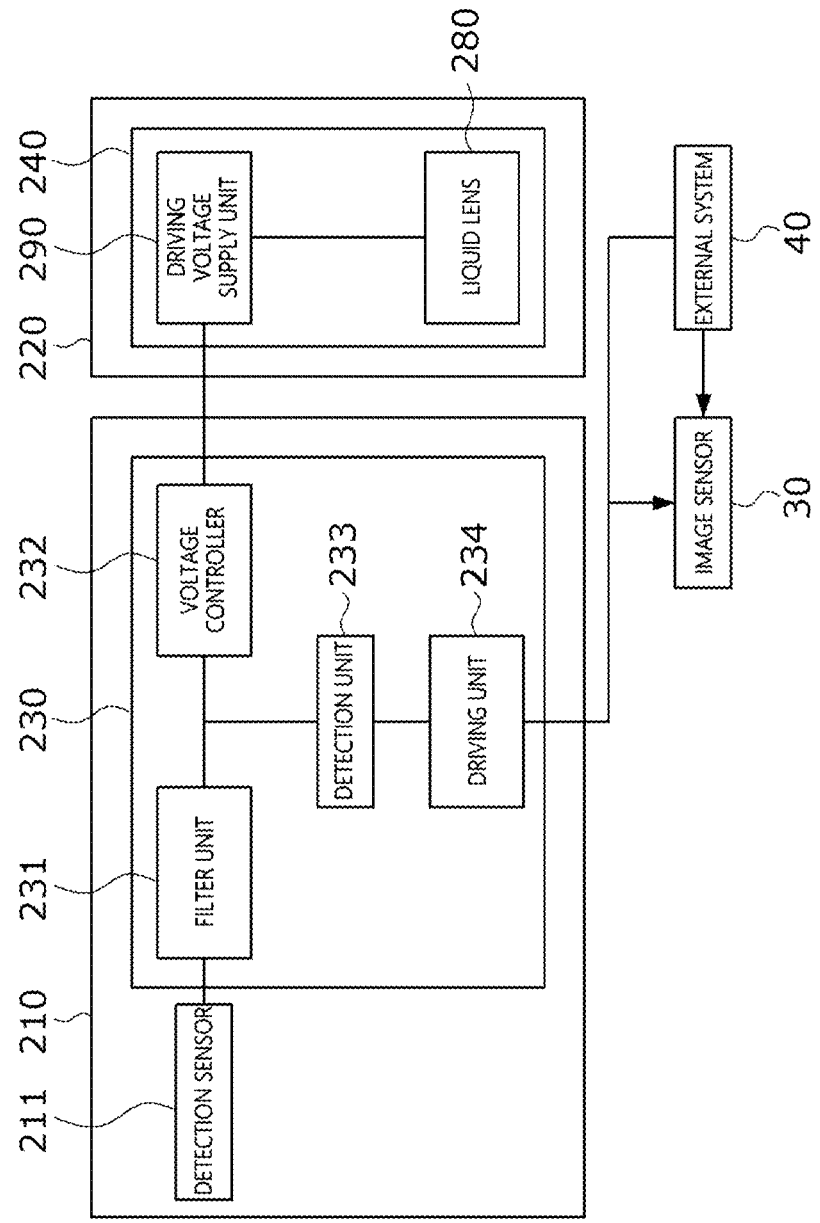
FIG. 8 is a block diagram of a camera module according to an embodiment.

FIG. 8 is a block diagram of a camera module according to an embodiment.

Referring to FIG. 8, a camera module 200 may include a control circuit 210 and a lens assembly 220. The control circuit 210 may correspond to the control circuit 20, and the lens assembly 220 may is the lens assembly 10, that is, may correspond to the lens assemblies 110, 120, 130, 140, 162, and 164.

Further, the control circuit 210 may include a detection sensor 211 and a controller 230 and may control an operation of a liquid lens 280 including the liquid lens 142.

Further, the controller 230 may have a configuration for performing an auto-focusing (AF) function or an optical Image stabilization (OIS) function and may control the liquid lens 280 included in the lens assembly 220 using a request of a user or a detection result (for example, a motion signal or the like of the detection sensor 211 (for example, a gyro sensor)). Here, the liquid lens 280 may correspond to the liquid lens 142.

The detection sensor 211 may include a gyro sensor that detects an angular velocity or the like. However, the embodiments are not limited thereto, and the detection sensor 211 may be located inside the controller 230.

Accordingly, the controller 230 may include the detection sensor 211, a voltage controller 232, a detection unit 233, and a driving unit 234. As described above, the detection sensor 211 may be an independent component that is not included in the controller 230 or may be included in the controller 230.

The detection sensor 211 may detect, for example, the angular velocity of movement in two directions such as a yaw axis and a pitch axis in order to compensate for vertical and horizontal hand shaking of the optical device. The detection sensor 211 may generate a motion signal having information on the detected angular velocity and provide the generated motion signal to the voltage controller 232.

A filter unit 231 may filter the signal received from the detection sensor 211. That is, the filter unit 231 may extract only a desired frequency band by removing a noise component. For example, in order to implement the OIS function, the filter unit 231 may extract only a desired frequency band by removing a high-frequency noise component from the motion signal using a low pass filter (LPF).

Further, in order to compensate for the calculated amount of hand shaking, the voltage controller 232 may calculate the driving voltage corresponding to a shape that the liquid lens 280 of the liquid lens module 240 should have.

The voltage controller 232 may receive information (that is, information on a distance from an object) for the AF function from an internal unit (for example, the image sensor 30) or an external unit (for example, a distance sensor or an application processor) of the optical device or the camera module 200 and may calculate, through the information on the distance, the driving voltage corresponding to the shape that the liquid lens 280 should have according to a focal length at which the liquid lens 280 is focused on the object.

Further, the voltage controller 232 may have a driving voltage table in which a driving voltage code is mapped with a driving voltage to generate the driving voltage, may acquire the driving voltage code corresponding to the calculated driving voltage with reference to the driving voltage table, and may output the acquired driving voltage code to the lens assembly 220 (for example, a driving voltage supply unit 290).

Alternatively, the voltage controller 232 may generate a driving voltage having an analog form corresponding to the driving voltage code on the basis of the provided driving voltage code having a digital form and may provide the generated driving voltage to the lens assembly 220.

Further, the voltage controller 232 may further include a voltage booster that receives a supply voltage (for example, a voltage supplied from a separate power circuit) and increase a voltage level, a voltage stabilizer for stabilizing output of the voltage booster, and a switching unit for selectively supplying the output of the voltage booster to each terminal of the liquid lens 280.

Here, the switching unit may include a configuration of a circuit called an H bridge. A high voltage output from the voltage booster may be applied to a power supply voltage of the switching unit. Further, the switching unit may selectively supply the applied power supply voltage and the ground voltage to opposite ends of the liquid lens 280.

Here, as described above, for driving, the liquid lens 280 includes the four first electrodes including four electrode sectors, the first connection substrate, the one second electrode, and the second connection substrate. Further, the opposite ends of the liquid lens 280 may be any one of the plurality of first electrodes and the second electrode. Further, the opposite ends of the liquid lens 280 may be any one end of the four electrode sectors of the four first electrodes and one end of the one electrode sector of the second electrode.

Accordingly, a voltage in the form of a pulse having a preset width may be applied to each of the electrode sectors of the liquid lens 280. Further, the driving voltage, which is a difference between voltages applied to the first electrodes and the second electrode, may be applied to the liquid lens 280.

In the embodiment, in order to control the driving voltage applied to the liquid lens 280 according to the driving voltage code having a digital form, the voltage controller 232 may generate the driving voltage having an analog form corresponding to the driving voltage code as the voltage booster controls the increased voltage level and the switching unit controls a phase of a pulse voltage applied to the common electrode and the individual electrodes. That is, the controller 230 may control a voltage applied to each of the first electrodes and the second electrode.

Further, the control circuit 210 may further include a connector (not illustrated) that performs a communication function or an interface function of the control circuit 210. For example, for communication between the control circuit 210 using an inter-integrated circuit (I2C) communication method and the lens assembly 220 using a mobile industry processor interface (MIPI) communication method, the connector may perform communication protocol conversion. Further, the connector may receive power form an external unit (for example, a battery) and supply power required for operating the controller 230 and the lens assembly 220. In this case, the connector may correspond to the connector 153 illustrated in FIG. 2.

Further, the lens assembly 220 may include the liquid lens module 240, and the liquid lens module 240 may include the driving voltage supply unit 290 and the liquid lens 280. Further, although it is illustrated that the driving voltage supply unit 290 is included in the liquid lens module 240, the driving voltage supply unit 290 may be included in the control circuit 210.

Further, the driving voltage supply unit 290 may receive the driving voltage from the voltage controller 232 and provide the driving voltage to the liquid lens 280.

The driving voltage supply unit 290 may include a voltage adjustment circuit (not illustrated) or a noise removal circuit (not illustrated) for compensating for a loss due to connection between terminals of the control circuit 210 and the lens assembly 220 or may control the voltage provided from the voltage controller 232 to be bypassed and provided to the liquid lens 280. Alternatively, the driving voltage supply unit 290 may be disposed inside the controller 230 to provide the voltage to the liquid lens 280.

Accordingly, the liquid lens 280 may perform at least one of the AF function or the OIS function. In the embodiment, an interface between the first liquid and the second liquid may be deformed according to the driving voltage generated when the liquid lens 280 performs the OIS function.

Next, the detection unit 233 may detect information on a frequency, a period, and the like of the motion signal detected by detection sensor 211. In the present embodiment, the description is based on a motion frequency, and the motion signal may be obtained from the angular velocity of the detection sensor (gyro sensor). That is, the detection unit 233 may detect the motion frequency for vibrations of the camera module due to hand shaking.

However, the voltage controller 232 may provide the driving voltage to the liquid lens 280 by performing the OIS function according to a change in the detected frequency, that is, vibrations of the camera module. Accordingly, the interface of the liquid lens 280 may be changed. In this case, a wavefront error (WFE) may occur due to a change in the interface of the liquid lens 280. In other words, the WFE may be generated by compensating for the movement (due to hand shaking) of the camera module (or the lens assembly and the liquid lens unit). Further, the WFE may be changed according to the detected frequency of the motion signal.

In this case, the driving unit 234 according to may output an operation signal with a timing having the smallest WFE corresponding to the detected frequency. That is, the driving unit 234 may change an imaging timing so that the WFE is minimized.

In the embodiment, when the motion frequency increases, the driving unit 234 may change the imaging timing so that the magnitude of the motion signal becomes close to an extreme value that is maximum. Further, when the motion frequency decreases, the driving unit 234 may change the imaging timing so that an inclination of the motion signal becomes close to a point that is largest. In order words, the driving unit 234 may move the imaging timing from a minimum value of the motion signal to the extreme value of the motion signal or an opposite value to the extreme value according to the increase or decrease of the motion frequency.

Due to this configuration, the camera module according to the embodiment may minimize the WFE due to an operation such as hand shaking. Here, the motion frequency may correspond to vibrations caused by hand shaking of the camera module. Further, since the vibrations caused by hand shaking corresponds to an excitation frequency for OIS, the motion frequency may correspond to the excitation frequency for the OIS.

Further, the changed imaging timing may be transmitted through an external system 40 or directly to the image sensor 30. The external system may be located outside the camera module. For example, the external system may be located on a terminal. Further, the external system 40 may be connected to the camera module in the above-described I2C communication method. However, the embodiments are not limited thereto, and the external system 40 may be connected in another communication method.

Further, the image sensor 30 may capture or acquire an image by performing imaging according to the corresponding imaging timing. Further, since the WFE is minimized in the acquired image, the camera module may provide improved image quality. Detailed operations of the detection unit and the driving unit will be described below.

Figure 9A:
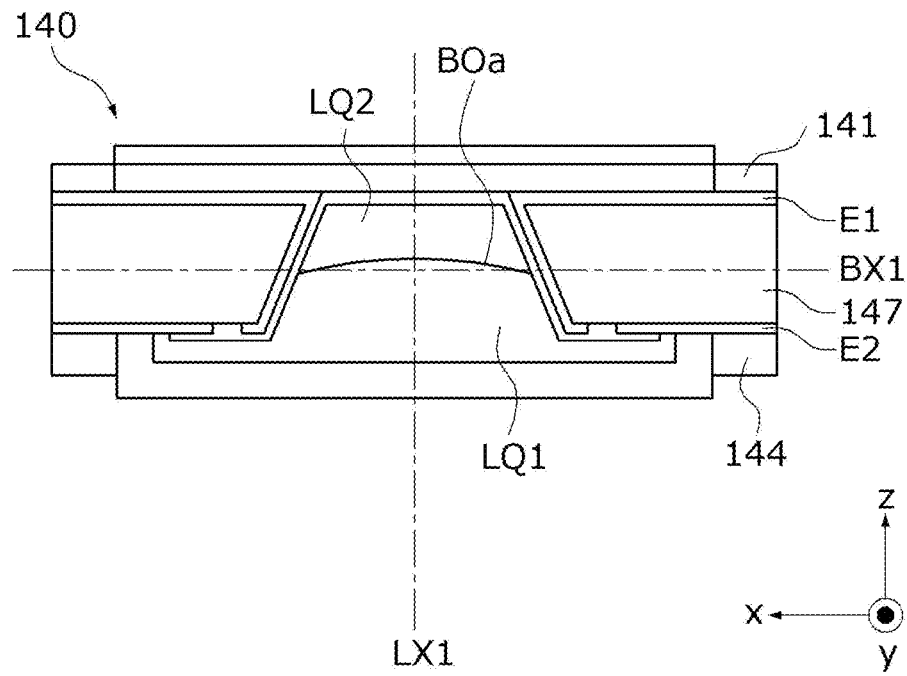
FIGS. 9A to 9C are views for describing driving of the camera module according to an embodiment.
Figure 9B:
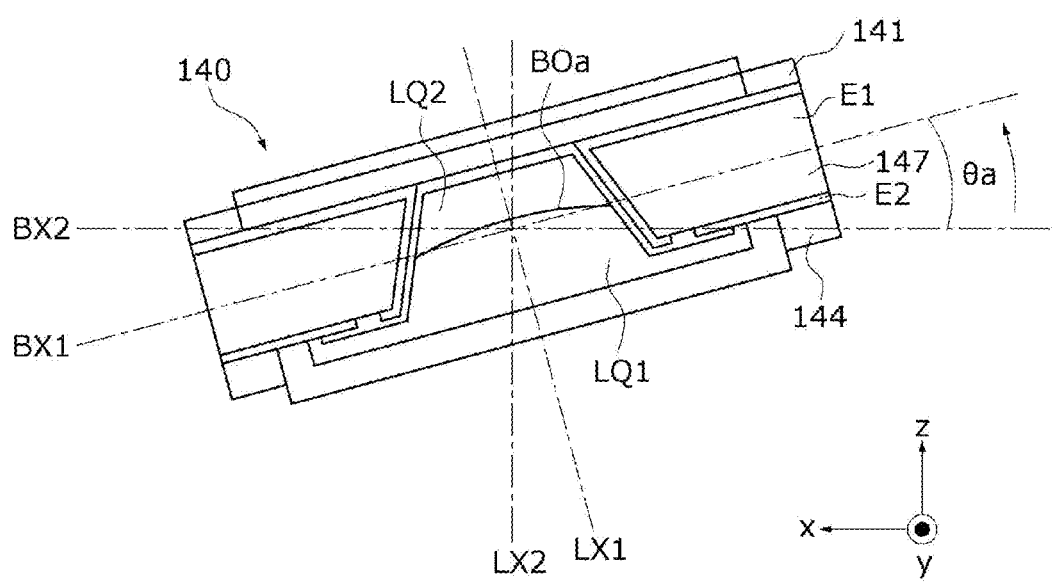
Figure 9C:
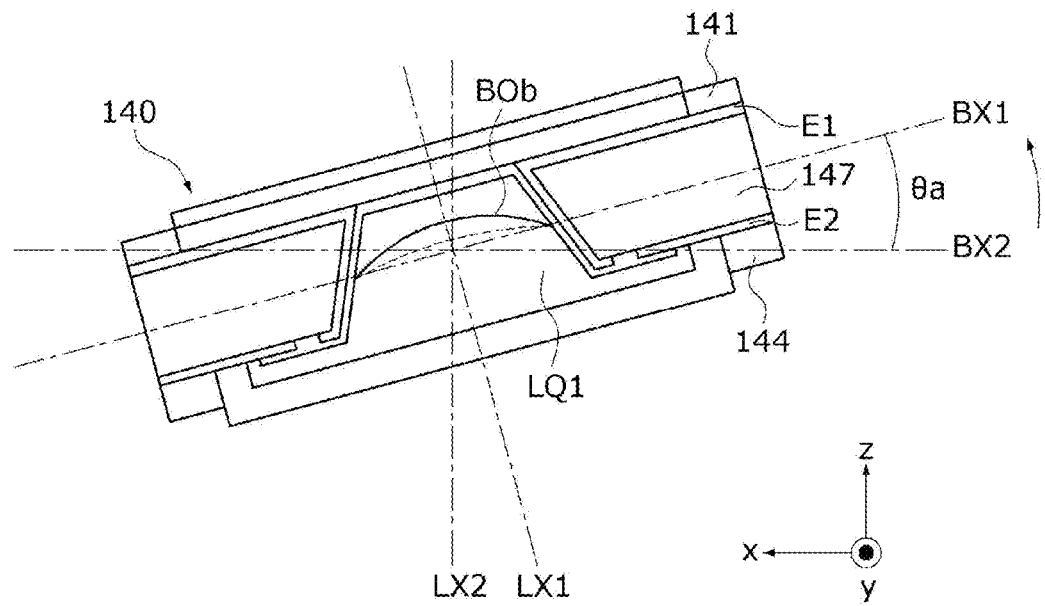

FIGS. 9A to 9C are views for describing driving of the camera module according to an embodiment.

First, referring to FIG. 9A, this is a case in which the camera module is not tilted due to hand shaking. In this case, an optical axis LX1 of the liquid lens unit 140 may be parallel to a Z-axis direction, and a vertical axis BX1 thereof may be parallel to an X-axis direction.

Referring to FIGS. 9B and 9C, the camera module may be tilted at a first angle θ1 due to hand shaking. In this case, as described above, in the camera module, the movement (that is, tilting) of the camera module (or the lens assembly) may be detected using the angular velocity detected by the detection sensor. For example, the camera module has an inclination difference between the current optical axis LX1 (or the vertical axis BX1) and a premovement optical axis LX2 (or a vertical axis BX2) at the first angle θ1. However, an interface BOa of the liquid lens may be maintained even when the camera module is tilted until the driving voltage is applied from the liquid lens unit 140.

However, to correspond to the tilting, the voltage controller may generate the driving voltage code (driving signal) to generate the driving voltage corresponding to the inclination. Thereafter, the driving voltage supply unit may receive the driving signal and provide the driving voltage corresponding to the driving signal to the liquid lens. Hereinafter, the driving signal will be used interchangeably with the driving voltage or the driving voltage code.

Further, to correspond to the driving voltage, an interface BOb of the liquid lens may be different from the interface BOa before the driving voltage is applied. Due to this configuration, the camera module according to the embodiment may be compensated for hand shaking.

Further, as described above, the interface of the liquid lens is changed by the driving voltage, and thus the WFE may occur. That is, the interface BOb of the liquid lens may vibrate due to the application of the driving voltage. In this case, in the camera module according to the embodiment, the detection unit may output the motion frequency from the motion signal of the camera module due to hand shaking, and the driving unit may change the imaging timing of the camera module according to the motion frequency. Further, the interface of the liquid lens may be periodically changed according to the motion frequency. For example, the WFE for the interface of the liquid lens may be changed according to the magnitude of the motion frequency. Accordingly, in the image sensor of the camera module, the imaging may be performed according to the imaging timing. Further, the imaging timing may be set to a time point at which the WFE is minimized. In other words, the camera module according to the embodiment may provide the imaging timing changed according to the motion frequency to minimize the WFE so as to provide an image having improved quality.

In detail, in the camera module according to the embodiment, when the motion frequency increases, the imaging timing may be moved from the minimum value of the motion signal to the extreme value of the motion signal.

In contrast, in the camera module according to the embodiment, when the motion frequency decreases, the imaging timing may be moved from the extreme value of the motion signal to the minimum value of the motion signal.

Accordingly, the camera module according to the embodiment may control the imaging of the image sensor at the imaging timing at which the WFE may be minimized from a change in the interface even when the interface of the liquid lens is changed by performing the OIS for shaking compensation. For example, the camera module according to the embodiment may calculate the imaging timing at which the WFE is minimized from Equation 1 described below. Alternatively, the imaging timing may be called from a pre-stored storage unit, but this may be derived from Equation 1 described below. In detail, the camera module according to the embodiment may calculate the imaging timing at which the WFE is minimized from Table 1 and Equation 1 below.

TABLE 1

| Motion frequency (f) | WFE minimum point 1 | WFE minimum point 2 | WFE minimum section (±20°) |
|---|---|---|---|
| 2 | 180 | 360 | 0~20°/160-200°/340~360° |
| 3 | 213.75 | 393.75 | 13.75~53.75°/193.75~233.75° |
| 4 | 247.5 | 427.5 | 47.5~87.5°/227.5~267.5° |
| 5 | 281.25 | 461.25 | 81.25~121.25°/261.25~301.25° |
| 6 | 315 | 495 | 115~155°/295~335° |
| 7 | 348.75 | 528.75 | 0~8.75°/148.75~188.75°/328.75~368.75° |
| 8 | 382.5 | 562.5 | 2.5~42.5°/182.5~222.5° |
| 9 | 416.25 | 596.25 | 36.25~76.25°/216.25~256.25° |
| 10 | 450 | 630 | 70~110°/250~290° |

$$\text{imaging timing}(WFE_{min} = 135° + \frac{1}{2}(67.5f - 45°) \pm 20° \pm 180nDEG(n \text{ is integer})) \quad \text{Equation 1}$$

(Here, f is a motion frequency and it is assumed that there is no phase difference between the motion frequency and a frequency of the WFE.)

Referring to Table 1 and Equation 1, two points (WFE minimum point 1 and WFE minimum point 2) at which the WFE is minimized may be present in one period (360°) of the motion frequency f. That is, the motion frequency may be greater than the frequency of the WFE generated from the interface of the liquid lens.

In the camera module according to the embodiment, two imaging timings (two sections) may be present during the period of the motion signal. That is, the camera module may have a certain number of sections in which the WFE is minimized even in the change in the motion signal such as hand shaking. Accordingly, even when various users or the like generate different hand shaking, the imaging control through the imaging timing may be performed the same number of times during one period. Accordingly, the camera module according to the embodiment may have improved power stability.

Figure 10A:
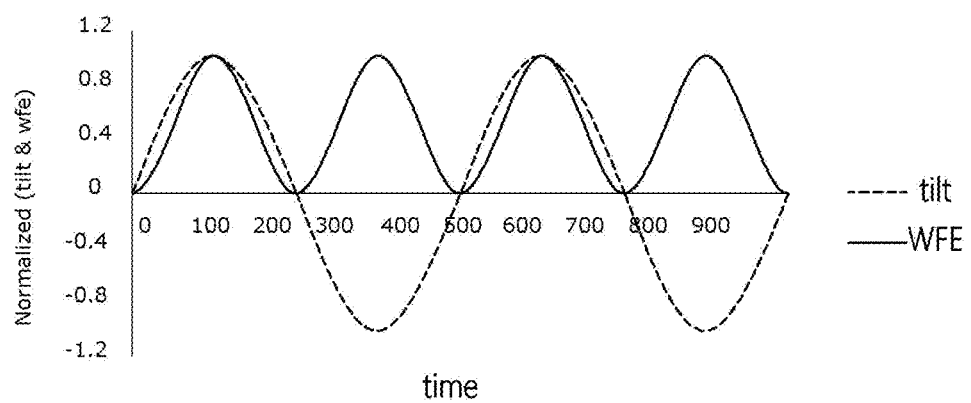
FIGS. 10A to 10C are views for describing driving of the camera module at a low motion frequency according to an embodiment.
Figure 10B:
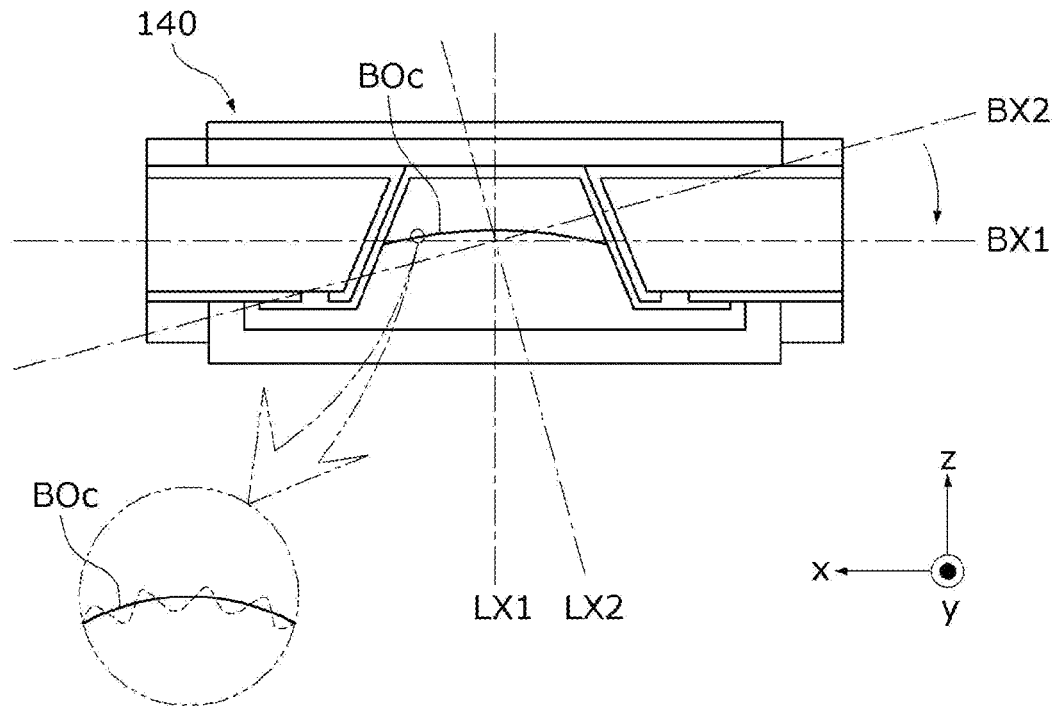
Figure 10C:
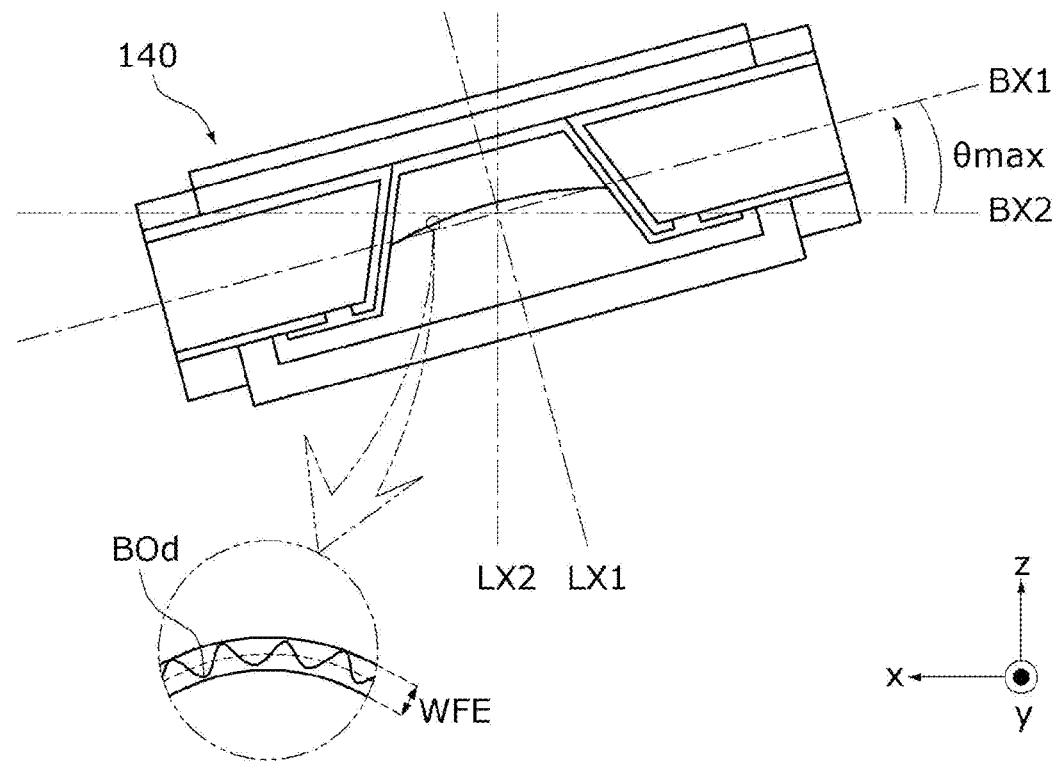
Figure 11A:
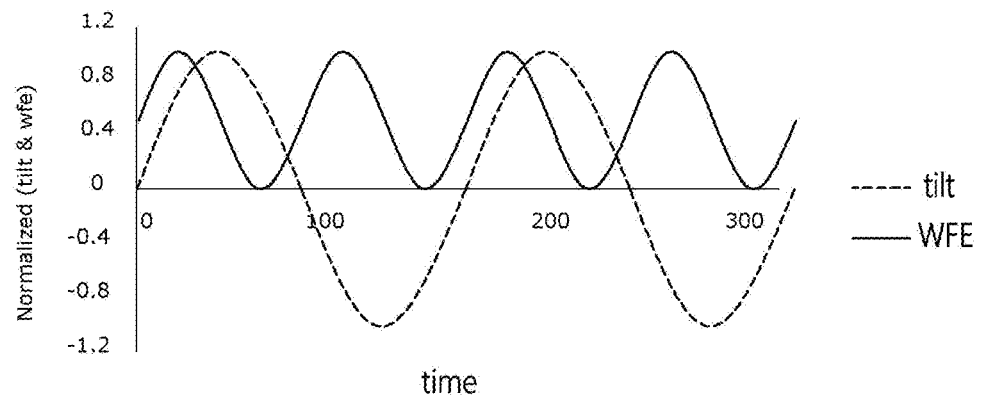
FIGS. 11A to 11C are views for describing driving of the camera module at an intermediate motion frequency according to an embodiment.
Figure 11B:
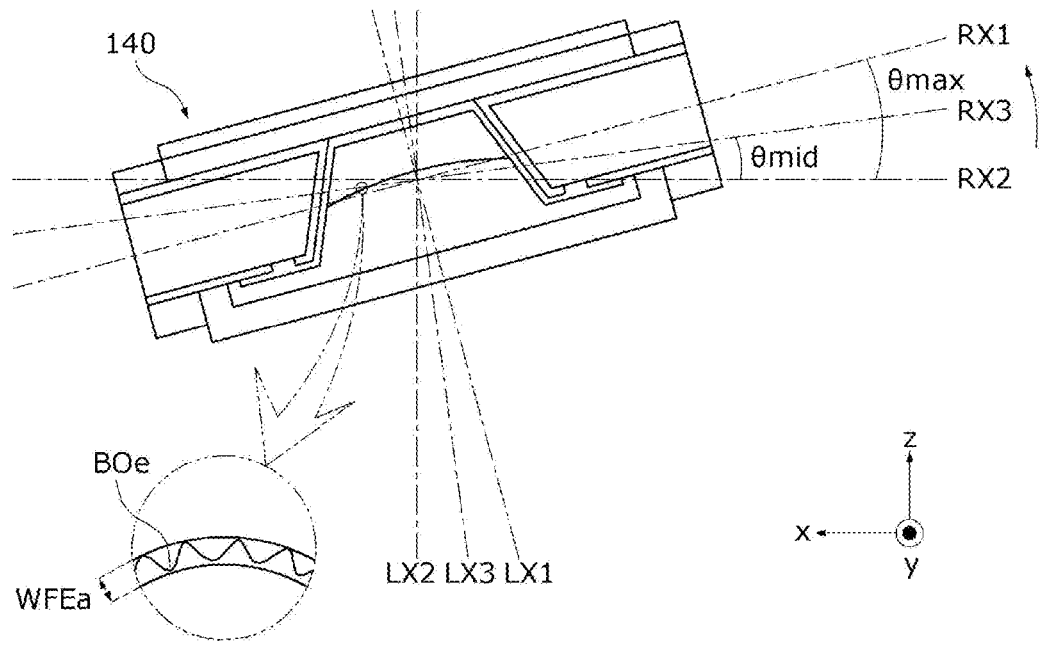
Figure 11C:
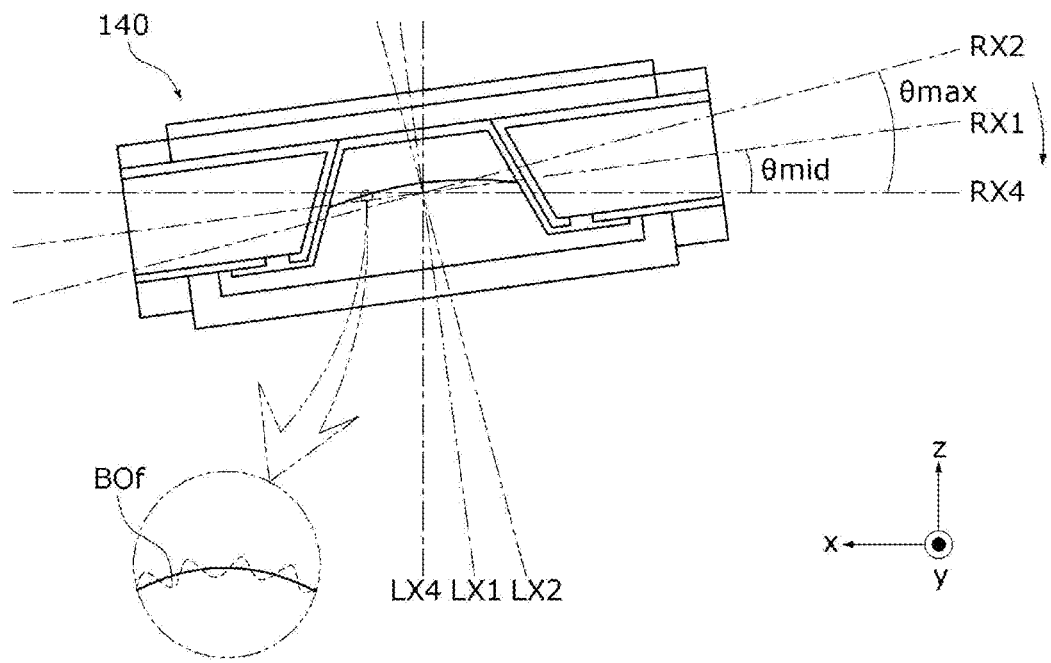
Figure 12A:
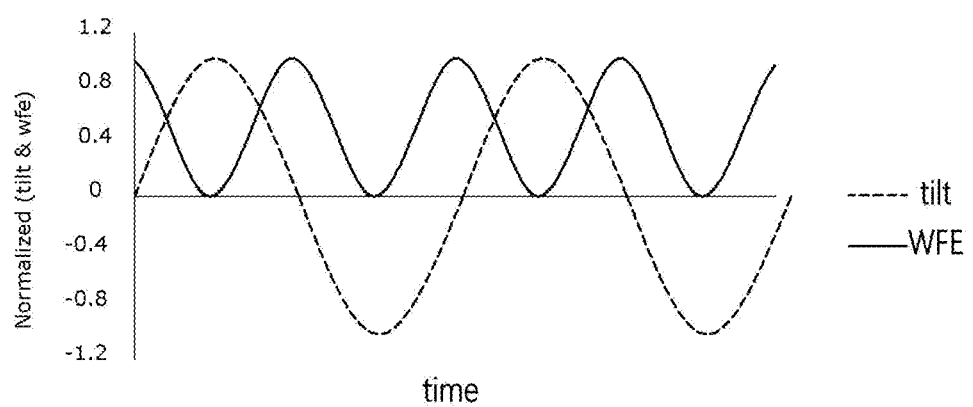
FIGS. 12A to 12C are views for describing driving of the camera module at a high motion frequency according to an embodiment.
Figure 12B:
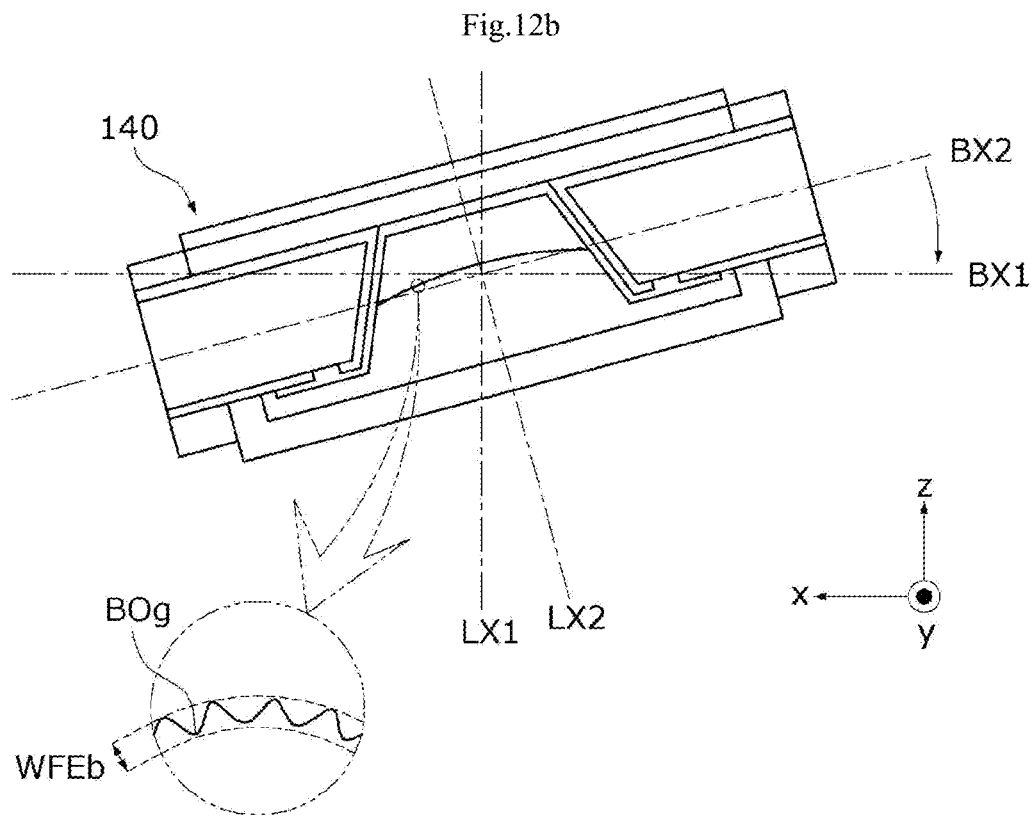
Figure 12C:
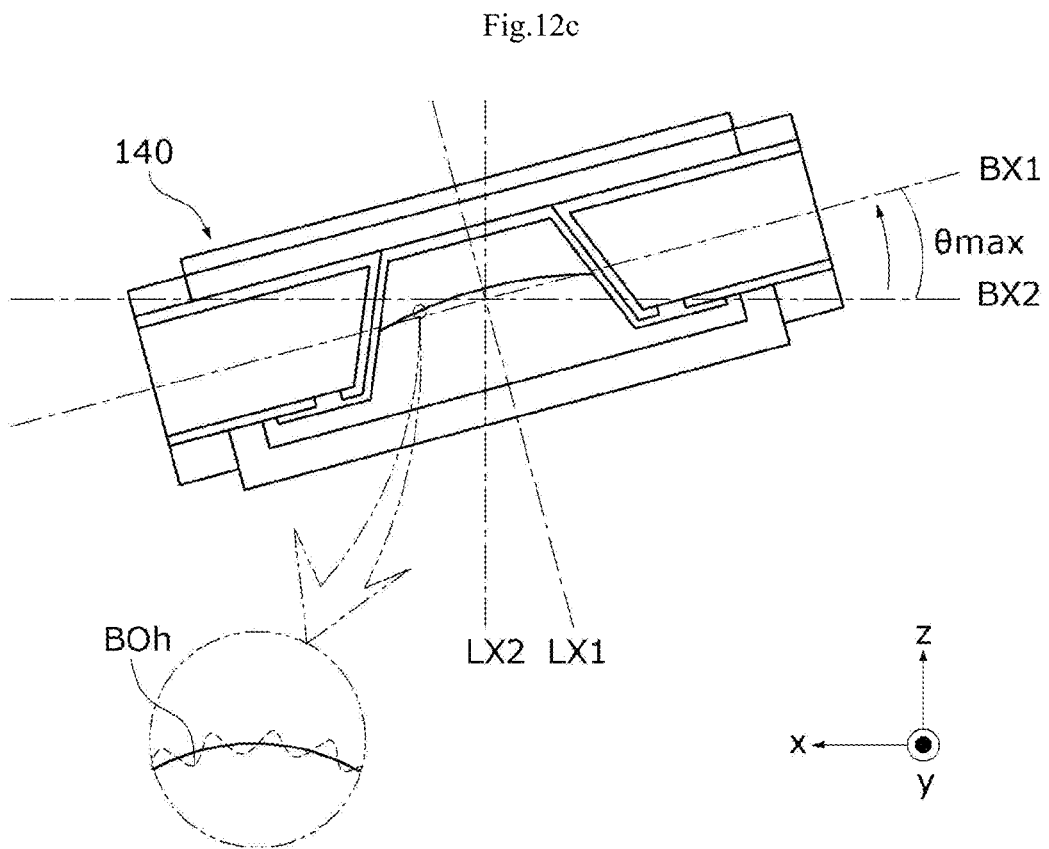

FIGS. 10A to 10C are views for describing driving of the camera module at a low frequency according to an embodiment, FIGS. 11A to 11C are views for describing driving of the camera module at an intermediate frequency according to an embodiment, and FIGS. 12A to 12C are views for describing driving of the camera module at a high frequency according to an embodiment.

In detail, FIG. 10A is a view illustrating a WFE signal and the motion signal at a low frequency (for example, 2 Hz), FIG. 10B is a view illustrating the liquid lens unit when the motion signal is zero, and FIG. 10C is a view illustrating the liquid lens unit when the motion signal is maximum.

Referring to FIGS. 10A to 10C, in the camera module (or the lens assembly and the liquid lens unit), the current optical axis (hereinafter, referred to as a first optical axis LX1) may be parallel to the Z axis, and a current vertical axis (hereinafter, referred to as a first vertical axis BX1) may be parallel to the X axis. This case will be described in a case in which a tilting angle is 0°, and tilting due to hand shaking is repeatedly performed symmetrically with respect to the X axis and the Z axis.

Further, the camera module is tilted due to hand shaking or the like, and thus may have the premovement optical axis (hereinafter, referred to as a second optical axis LX2) and the premovement vertical axis (hereinafter, referred to as a second vertical axis BX2) before the camera module is tilted in the first optical axis LX1.

Referring to FIG. 10B, when the motion frequency is low and when the first optical axis LX1 is situated at a location in which the tilting angle is 0°, a change in interface BOc of the liquid lens is minimized, and thus the WFE may be minimized.

In contrast, referring to FIG. 10C, when the motion frequency is low, the second optical axis LX2 may form the tilting angle of 0°, and an angle difference between the first optical axis LX1 and the second optical axis LX2 may be a maximum angle $\theta_{max}$. Here, since the vertical axis and the optical axis are perpendicular to each other, description will be made below on assumption that an angle difference between the vertical axes is the same as an angle difference between the optical axes.

In this case, in the camera module (or the lens assembly or the liquid lens unit), since a change in interface BOd of the liquid lens is large, the WFE may occur. That is, when the motion frequency is low, in the camera module, the WFE may be minimized at a time point at which the tilting angle is 0°, that is, at 180° and 360° in one period (0° to 360°) of the tilting of the camera module. This is because the camera module is stabilized on a reference axis (the X axis or the Z axis) of shaking when the motion frequency is low.

FIG. 11A is a view illustrating the WFE signal and the motion signal at an intermediate frequency (for example, 6 Hz), FIG. 11B is a view illustrating the liquid lens unit when the motion signal is at a maximum angle, and FIG. 11C is a view illustrating the liquid lens unit when the motion signal is at a middle angle.

As described above, the camera module is tilted due to hand shaking or the like and thus may have the premovement optical axis (hereinafter, referred to as the second optical axis LX2), a third optical axis LX3 between the first optical axis LX1 and the second optical axis LX2, the premovement vertical axis (hereinafter, referred to as the second vertical axis BX2), and a third vertical axis BX3 between the first vertical axis BX1 and the second vertical axis BX2.

Referring to FIG. 11B, when the motion frequency is an intermediate frequency, the second optical axis LX2 is located at the tilting angle 0°, the angle difference between the first optical axis LX1 and the second optical axis LX2 may be the maximum angle $\theta_{max}$, and an angle difference between the third optical axis LX3 and the second optical axis LX2 may be a middle angle $\theta_{mid}$ that is smaller than the maximum angle $\theta_{max}$. In this case, since the liquid lens unit has the first optical axis LX1 greater than the second optical axis LX2 and the third optical axis LX3, an interface BOe of the liquid lens may be changed.

Unlike this, referring to FIG. 11C, when the motion frequency is an intermediate frequency, an angle difference between the second optical axis LX2 and a fourth optical axis LX4 having a tilting angle of 0° may have the maximum angle $\theta_{max}$, and the first optical axis LX1 may be located between the second optical axis LX2 and the fourth optical axis LX4. This may be before the camera module moves from the second optical axis LX2 to the fourth optical axis LX4.

In this case, in the camera module (or the lens assembly or the liquid lens unit), since a change in interface BOf of the liquid lens is minimized, the WFE may be minimized. That is, when the motion frequency is an intermediate frequency, the camera module may be located between time points at which the tilting angle is 0°. For example, the WFE may be reduced as a phase becomes closer to an angle between 90° to 180° and an angle between 270° and 360° in the one period of the tilting of the camera module.

FIG. 12A is a view illustrating the WFE signal and the motion signal at a high frequency (for example, 10 Hz), FIG. 12B is a view illustrating the liquid lens unit when the motion signal is zero, and FIG. 12C is a view illustrating the liquid lens unit when the motion signal is at a maximum angle.

As described above, the camera module is tilted due to hand shaking or the like, and thus may have the premovement optical axis (hereinafter, referred to as the second optical axis LX2) and the premovement vertical axis (hereinafter, referred to as the second vertical axis BX2) before the camera module is tilted in the first optical axis LX1.

Referring to FIG. 12B, when the motion frequency is high and when the first optical axis LX1 is situated at a location in which the tilting angle is 0°, a change in interface BOg of the liquid lens is generated, and thus the WFE may be generated.

In contrast, referring to FIG. 10C, when the motion frequency is high, the second optical axis LX2 may form the tilting angle of 0°, and the angle difference between the first optical axis LX1 and the second optical axis LX2 may be a maximum angle $\theta$.

In this case, in the camera module (or the lens assembly or the liquid lens unit), since a change in interface BOh of the liquid lens is minimized, the WFE may be minimized. That is, when the motion frequency is high, in the camera module, the WFE may be minimized at a time point at which the tilting angle is maximum, that is, at 90° and 270° in one period of the tilting of the camera module. This is because, when the motion frequency is high, the camera module is stabilized as an angle difference between reference axes (the X axis or the Z axis) of shaking becomes larger.

Further, unlike a case in which the motion frequency is low, the WFE may increase as the tilting angle becomes closer to 0°. That is, when the motion frequency increases, a time point (imaging timing) at which the WFE is minimized may move from the minimum value of 0° of the motion signal to the extreme value of 90° or 270° of the motion signal. In contrast, when the motion frequency decreases, a time point at which the WFE is minimized may move from the extreme value of 90° or 270° of the motion signal to the minimum value of 0° of the motion signal.

The invention claimed is:

1. A camera module comprising:
   a lens assembly including a liquid lens;
   an image sensor that receives light passing through the lens assembly;
   a detection sensor that detects a motion of the lens assembly to generate a motion signal;
   a voltage controller that generates a driving signal for adjusting an interface of the liquid lens in response to the motion signal;
   a detection unit that outputs a motion frequency from the motion signal; and
   a driving unit that changes an imaging timing of the image sensor according to the motion frequency,
   wherein, when the motion frequency increases, the driving unit moves the image timing from a minimum value of the motion signal to an extreme value of the motion signal.

2. The camera module of claim 1, wherein the interface of the liquid lens is periodically changed according to the motion frequency.

3. The camera module of claim 1, wherein, when the motion frequency decreases, the driving unit moves the imaging timing from an extreme value of the motion signal to a minimum value of the motion signal.

4. The camera module of claim 3, wherein the driving unit moves the imaging timing to a point at which an inclination of the motion signal is maximum.

5. The camera module of claim 1, wherein the motion frequency is greater than a frequency of a wavefront error for the interface of the liquid lens.

6. The camera module of claim 5, wherein a magnitude of the wavefront error has a constant number or section during one period even when the frequency of the motion signal is changed.

7. The camera module of claim 1, wherein the image sensor performs imaging at the imaging timing.

8. The camera module of claim 1, wherein the interface of the liquid lens is changed by the driving signal.

9. The camera module of claim 2, wherein a wavefront error for the interface of the liquid lens is changed according to a magnitude of the motion frequency.

* * * * *